United States Patent
Scorsi et al.

(10) Patent No.: US 8,458,371 B2
(45) Date of Patent: Jun. 4, 2013

(54) PERIPHERAL DEVICES INTEGRATED INTO A PROCESSING CHAIN

(75) Inventors: Rafael Castro Scorsi, Round Rock, TX (US); Neil S. Feiereisel, Cedar Park, TX (US); Glen O. Sescila, III, Lago Vista, TX (US); Craig M. Conway, Leander, TX (US); Brian Keith Odom, Georgetown, TX (US); M. Dean Brockhausen, Jr., Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 542 days.

(21) Appl. No.: 12/534,564

(22) Filed: Aug. 3, 2009

(65) Prior Publication Data

US 2011/0029691 A1  Feb. 3, 2011

(51) Int. Cl.
*G06F 3/00* (2006.01)
(52) U.S. Cl.
USPC .................................................. 710/8
(58) Field of Classification Search
USPC .................................................. 710/8
See application file for complete search history.

(56) References Cited

U.S. PATENT DOCUMENTS

| | | | |
|---|---|---|---|
| 5,765,022 A | | 6/1998 | Kaiser et al. |
| 5,771,356 A | * | 6/1998 | Leger et al. ............ 709/233 |
| 6,141,705 A | * | 10/2000 | Anand et al. ............ 710/15 |
| 6,542,838 B1 | * | 4/2003 | Haddad et al. ............ 702/88 |
| 2004/0005859 A1 | * | 1/2004 | Ghercioiu et al. ............ 455/3.01 |
| 2007/0022204 A1 | | 1/2007 | Moch et al. |
| 2008/0172509 A1 | | 7/2008 | Tsunoda |

OTHER PUBLICATIONS

Co-pending U.S. Appl. No. 12/534,492 entitled "Data Movement System and Method", filed Aug. 3, 2009.
"Summary of National Instruments NI-FGEN and NI-SCOPE Driver Aug. 2008 Release",prepared Nov. 2009. (2 pages).
Office Action for U.S. Appl. No. 12/534,492 mailed on Nov. 15, 2010; 11 pages.

* cited by examiner

*Primary Examiner* — Henry Tsai
*Assistant Examiner* — Juanito Borromeo
(74) *Attorney, Agent, or Firm* — Meyertons Hood Kivlin Kowert & Goetzel, P.C.; Jeffrey C. Hood

(57) ABSTRACT

Provided in some embodiment is a computer system, including a first peripheral device, having a first external data input, a first peripheral storage device to store the measurement data, a first peripheral device output to couple to a system interconnect of the computer system. The first peripheral device capable of receiving measurement data via the external data input the first peripheral device capable of transferring at least a portion of the measurement data to a second peripheral device of the computer system via the system interconnect, and where the second peripheral device is capable of processing at least a portion of the measurement data transferred to the second peripheral device.

22 Claims, 12 Drawing Sheets

PERIPHERAL DEVICES INTEGRATED INTO A PROCESSING CHAIN

BACKGROUND OF THE INVENTION

1. Field of the Invention

This invention relates to a system and method of offloading processing functions between devices of a computer system and more particularly to the exchange of data from one peripheral device to another peripheral device for processing.

2. Description of the Related Art

Data acquisition (DAQ) typically includes acquiring and processing of data in a computer system. Some DAQ applications may involve in-line, real time, processing of data. There may be several motivations for the in-line processing. Among these motivations may be real time and deterministic demands of the application itself. It is not uncommon, however, for some computer based DAQ systems to suffer from performance issues. Some of the factors limiting performance may include the overhead of the operating system (OS) and other applications running on the host processor, the lack of deterministic execution in a non-real time OS, the lack of computer power for the specified application and computer power that does not scale with the demands of the application etc.

Several solutions have been implemented to try to get around these issues. In some cases, at least a portion of processing is done on a DAQ device (e.g., a DAQ board), or similar computer device. In some situations the processing load is offloaded from a device to a host processor or from a host processor to a device so that processing may be accomplished in a timely and deterministic manner. Some of these solutions may involve some form of a dedicated co-processor that may offload computational tasks from a host processor in a way that helps to make the application more deterministic and efficient. These solutions, however, are generally limited to transfer of data between a device and the host processor, and typically rely on fixed connections between the co-processor and I/O channels that do not provide a flexible solution. Accordingly it is desirable to provide a system and method for the transfer and processing of data between devices that may provide a flexible/customizable solution.

SUMMARY

Described herein are embodiments relating to a system and method of transferring data from one peripheral device to another for processing. For example, in one embodiment, provided is a computer system, including a first peripheral device, having a first external data input, a first peripheral storage device to store the measurement data, and a first peripheral device output to couple to a system interconnect of the computer system. The first peripheral device is capable of receiving measurement data via the external data input. The first peripheral device is capable of transferring at least a portion of the measurement data to a second peripheral device of the computer system via the system interconnect and the second peripheral device is capable of processing at least a portion of the measurement data transferred to the second peripheral device.

In another embodiment, provided is a computer system that includes a system interconnect, a first peripheral device to receive measurement data via an external input and a second peripheral device that includes a processor to process measurement data. The first peripheral device has an output coupled to the system interconnect and the second peripheral device has an input coupled to the system interconnect. The first peripheral device is able to directly transfer to the second peripheral device, via the system interconnect, at least a portion of the measurement data received by the first peripheral device via the external input. The processor of the second peripheral device is able to process at least a portion of the measurement data transferred to the second peripheral device.

In yet another embodiment, provided is a method that includes providing measurement data at an external input of a first peripheral device of a computer system and transferring measurement data directly from the first peripheral device to a second peripheral device via a system interconnect. The second peripheral device includes a processor able to process at least a portion of the measurement data transferred. The method also includes directly transferring measurement data via the system interconnect that includes transferring measurement data from the first peripheral device to the second peripheral device without passing the data through a processor or memory of a host central processing unit of the computer system.

BRIEF DESCRIPTION OF THE DRAWINGS

A better understanding of the present invention can be obtained when the following detailed description of the preferred embodiment is considered in conjunction with the following drawings, in which.

Figure 1:
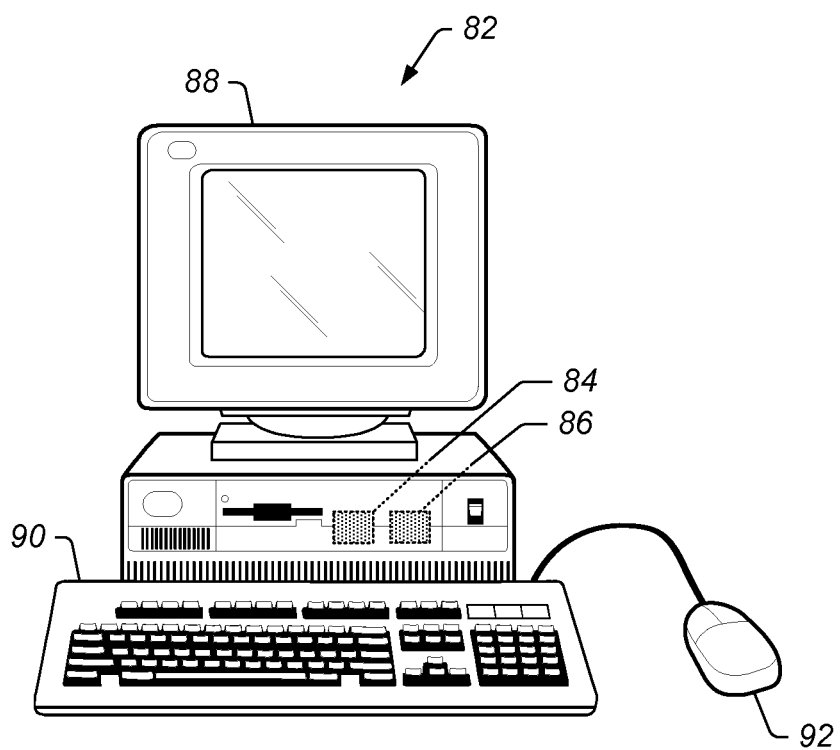
FIG. 1 is a diagram that illustrates an exemplary computer system in accordance with one or more embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (e.g., having the potential to, being able to), not a mandatory sense (e.g., must).

DETAILED DESCRIPTION

Definitions

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIFO—a first in first out device. A FIFO is commonly constructed from a static random access memory (SRAM). Data are output from a FIFO in the sequence it arrived, that is, the first arriving data item is the first to be sent.

Streaming—refers to the quasi-continuous transfer of data. Data may be streamed from a source device (e.g., a data acquisition device) to a target device (e.g., an output device) across an interconnect medium that may include combinations of networks, buses, switched fabrics and point-to-point links. Data may be streamed through intermediate devices and may be modified by those devices as it is streamed. Streaming is generally associated with large quantities of data being transferred in real-time.

Peripheral Device—refers to a device coupled to a computer system (e.g., one or more modular boards), that is not a host device (e.g., host processor, such as a CPU and/or host memory). A peripheral device may include a printed circuit board (PCB) or card that is installed into a modular computer system via an expansion slot (e.g., a slot of a rack or chassis). A peripheral device may include supporting circuitry such as processors, bus interface circuitry, storage elements (such as random access memory (RAM) and read-only memory (ROM)), a peripheral controller/processor and its associated firmware.

Measurement Data—refers to data received at an external input of a computer system device. For example, measurement data may refer to signals/data received at an external input to a data acquisition board, a computer based-instrument, or a similar test and measurement device. Measurement data may include a signal (e.g., an analog of digital signal) and/or data associated with a signal.

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

As discussed in more detail below, certain embodiments include a computer system having multiple peripheral devices that may be configured to share data and operate together to perform one or more processing functions. In some embodiments, data on one peripheral device may be transferred to another peripheral device for processing by the other peripheral device. In some embodiments, the transfer of data may occur directly between peripheral devices without passing data to or from a host processor. In some embodiments, multiple peripheral devices may be configured to input, transfer, process and/or output data independent of a central processing unit of a host.

In certain embodiments, peripheral devices may be configured to perform certain processing functions (e.g., process monitoring, equipment testing, system control, robotic control etc.) In some embodiments, the functionality of the system may be augmented by the addition of an expansion board (and associated peripheral device). Peripheral devices may include input devices, output devices, input/output devices, processors, controllers, communications devices, reconfigurable devices, customized hardware devices, storage devices and so and so forth. In some embodiments, the processing capability of a system may be increased by the addition of a new or replacement processor on peripheral devices. In some embodiments, peripheral device configuration may be performed automatically by software running on the computer system and it may involve human input. Embodiments may display (graphically or otherwise) system information and a system user may utilize that displayed information to select devices, boards, data flow among devices and many other system characteristics. Embodiments may be configured to perform multiple tasks concurrently. In some embodiments, device configuration may involve sending configuration information to a peripheral device, where the information may either directly configure the peripheral device or it may be used to configure the peripheral device.

In some embodiments, system configuration may involve configuring peripheral devices for sharing data (e.g., sending or receiving data) with other devices (notably other peripheral devices). In certain embodiments, data may be shared (and processed) as follows. A peripheral device may receive data from a single source (e.g., a peripheral input device), process the received data and then send processed data to a single target (e.g., a peripheral output device). In some embodiments, such peripheral-to-peripheral data transfers may be performed without routing data through a host CPU or host memory. Peripheral-to-peripheral transfers like this may be referred to as "direct" peripheral-to-peripheral transfers. In certain embodiments, data may be sent between peripheral devices using a host controller, which may read data from a source peripheral device and write data to a target peripheral device. Peripheral-to-peripheral transfer in which data is routed through a host controller's CPU or a host controller's memory may be referred to as "indirect" transfers.

In some embodiments, a single peripheral device may send data to a number of target devices (e.g., target peripheral devices). In such embodiments, different portions of output data may be sent to different targets devices so that, for example, a large task may be subdivided among target devices. Also, in such embodiments, the same output data may be broadcast to a number of target devices, so that, for example, multiple operations may be performed on the same data. In some embodiments, a single target peripheral device may receive data from multiple sources. In some embodiments, peripherals may send data to and receive data from a host CPU or host memory.

In some embodiments, a peripheral device configured for processing and transferring data may be used to perform a function that may have been offloaded from a host CPU. In some embodiments, a peripheral device may be added to a system via an expansion card. A new peripheral device may be intended to augment, supplement or replace an existing peripheral device and thus allow a system to perform a new function and/or perform an existing function in a more beneficial manner. In some embodiments, when a new peripheral device is added, a configuration step may be used to integrate the new device into a processing chain.

When appropriately configured, such peripheral devices may operate largely independently of a host CPU and may share data with each other to perform a chosen function (or functions). Embodiments may enable certain types of processing to be offloaded from a host CPU or a peripheral device to one or more other peripheral devices. Embodiments may offer more determinacy of execution time and superior real time performance.

Turning now to the figures, FIG. 1 depicts an exemplary computer system 82 which may implement embodiments of the invention. Computer system 82 may be operable to execute the computer programs to implement computer-based systems and methods of data streaming described herein. The illustrated computer system 82 may include components such as CPU 84 and a memory medium 86, such as random access memory (RAM), flash memory, hard-drives, and/or CD-ROMs. Memory medium 86 may include a storage medium having program instructions stored thereon, wherein the program instructions are executable to implement one or more embodiments of the present technique. The program instructions may be executable by CPU 84, for instance. In the illustrated embodiment, computer system 82 includes a display device 88, such as monitor, an alphanumeric input device 90, such as keyboard, and a directional input device 92, such as mouse. In one embodiment, computer system 82 may include modular and plug-in boards/cards (e.g., with either commercially available or proprietary hardware) that may be added via a number of expansion slots internal or external to the computer body (e.g., PCI or PCI Express slots). This system may be used for a wide variety of functions. For example, computer system 82 may be used for data acquisition (DAQ) when a DAQ digitizing board is plugged in and associated software is run.

Figure 2A:
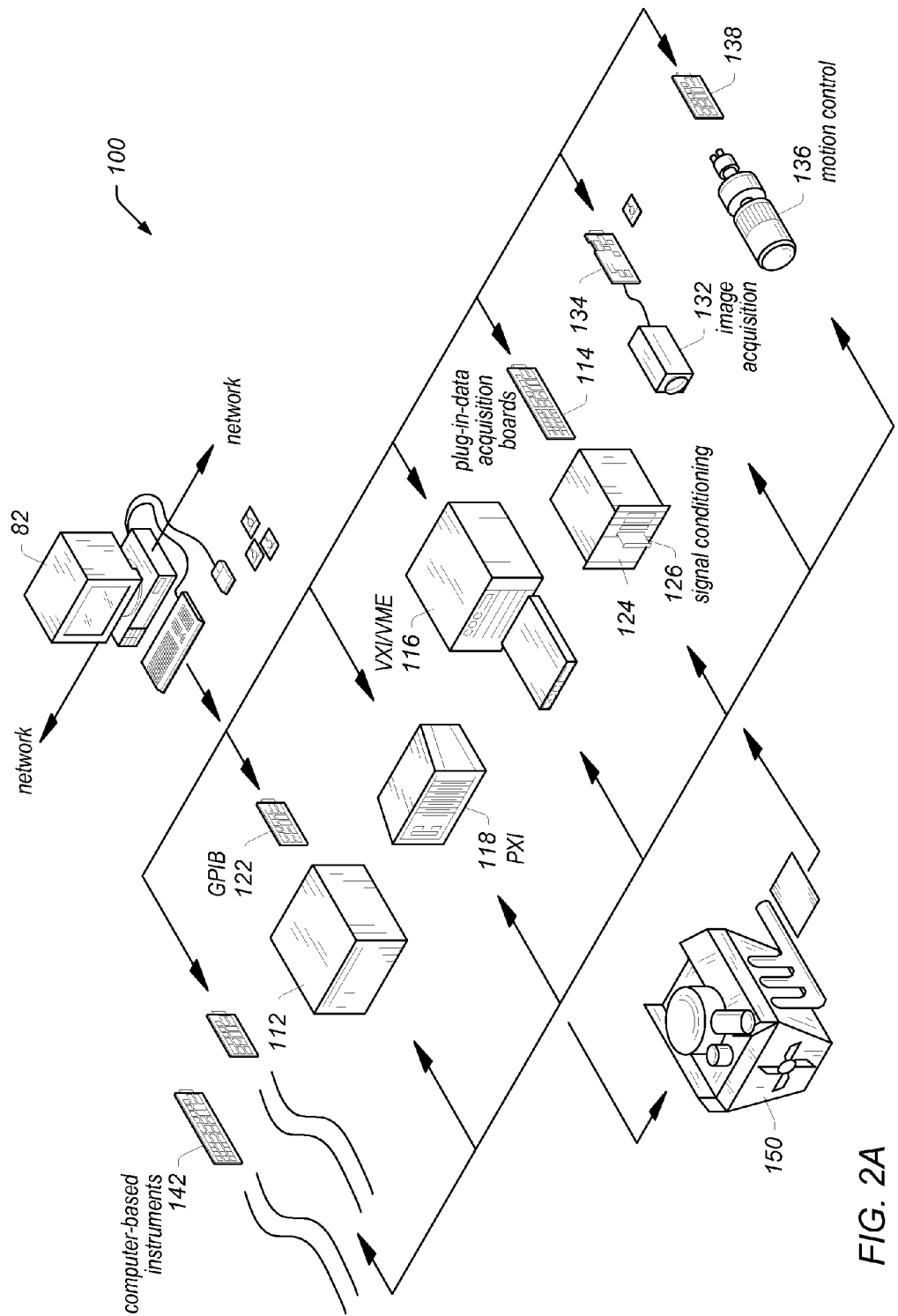
FIG. 2A is a diagram that illustrates an exemplary system that may execute or utilize programs in accordance with one or more embodiments of the present invention.
Figure 2B:
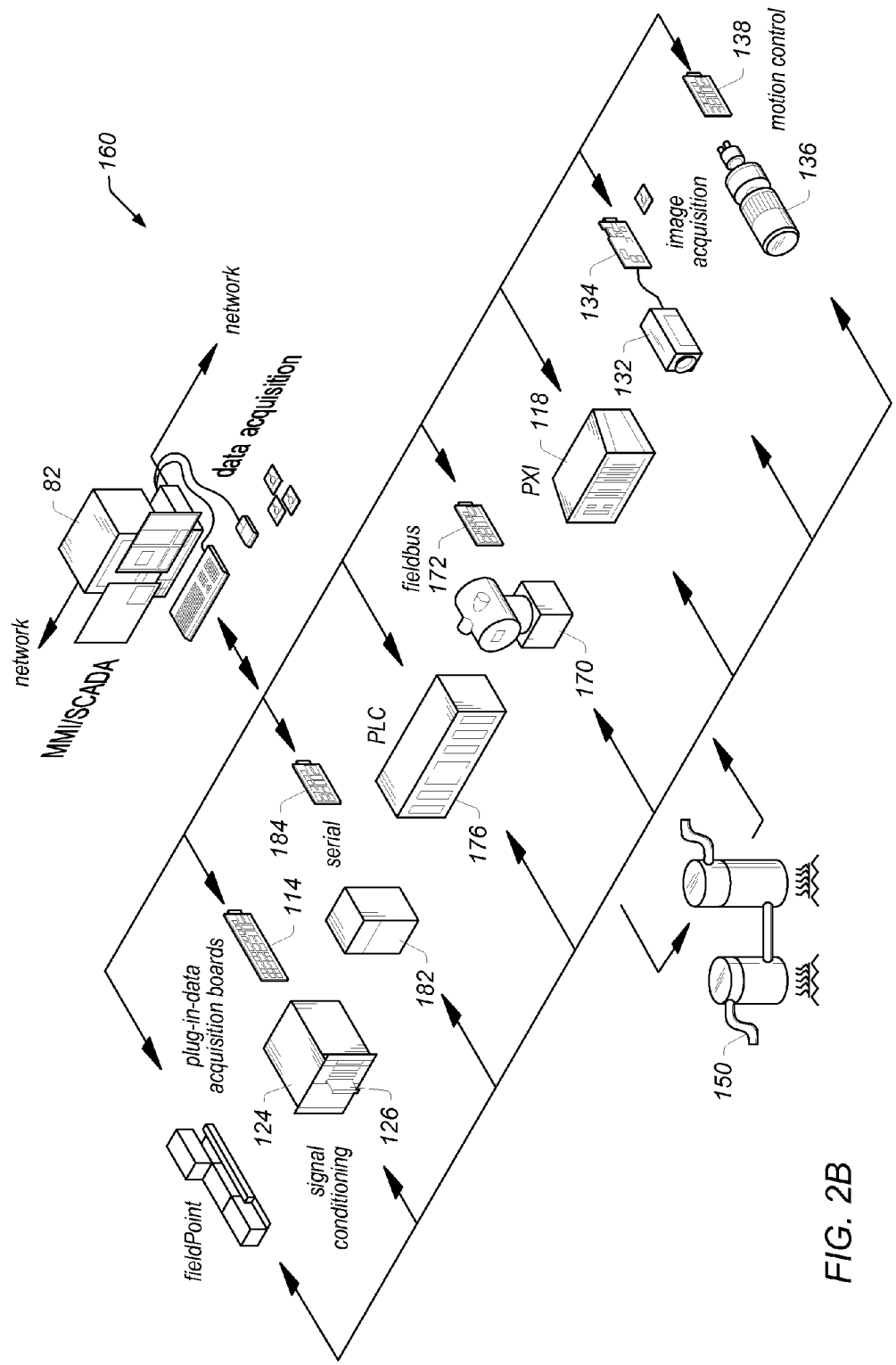
FIG. 2B is a diagram that illustrates an exemplary system that may perform control and/or simulation functions in accordance with one or more embodiments of the present invention.

FIG. 2A illustrates an exemplary instrumentation control system 100 which may implement embodiments of the invention. FIG. 2B illustrates an exemplary industrial automation system 160 that may implement embodiments of the invention. The industrial automation system 160 may be similar to the instrumentation or test and measurement system 100 shown in FIG. 2A. Elements which are similar or identical to elements in FIG. 2A have the same reference numerals for convenience.

The illustrated system 100 may include host computer system 82 that may be configured to connect to one or more instruments/devices. In such a configuration, computer system 82 may operate with the one or more instruments to analyze, measure or control one or more devices or processes 150. Computer system 82 may operate with the one or more devices in communication with process or device 150 to perform an automation function, such as MMI (Man Machine Interface), SCADA (Supervisory Control and Data Acquisition), portable or distributed data acquisition, process control, advanced analysis, or other control, among others. System 100 may be used in a data acquisition and control application, in a test and measurement application, an image processing or machine vision application, a process control application, a man-machine interface application, a simulation application, or a hardware-in-the-loop validation application, among others.

According to embodiments, one or more of the instruments and devices of FIG. 2A (and FIG. 2B) may include a programmable hardware element, configured with an FPGA or a processor and memory, and may be further configured with one or more portions of user code, as will be described in more detail below. The one or more instruments may include a GPIB instrument 112 and associated GPIB interface card 122, a data acquisition board 114 and associated signal conditioning circuitry 124 and boards 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. Further, the one or more devices may include a fieldbus device 170 and associated fieldbus interface card 172, a Programmable Logic Controller (PLC) 176, a serial instrument 182 and associated serial interface card 184, or a distributed data acquisition system, such as the Fieldpoint system available from National Instruments Corporation, having headquarters in Austin, Tex., among other types of devices.

Figure 3:
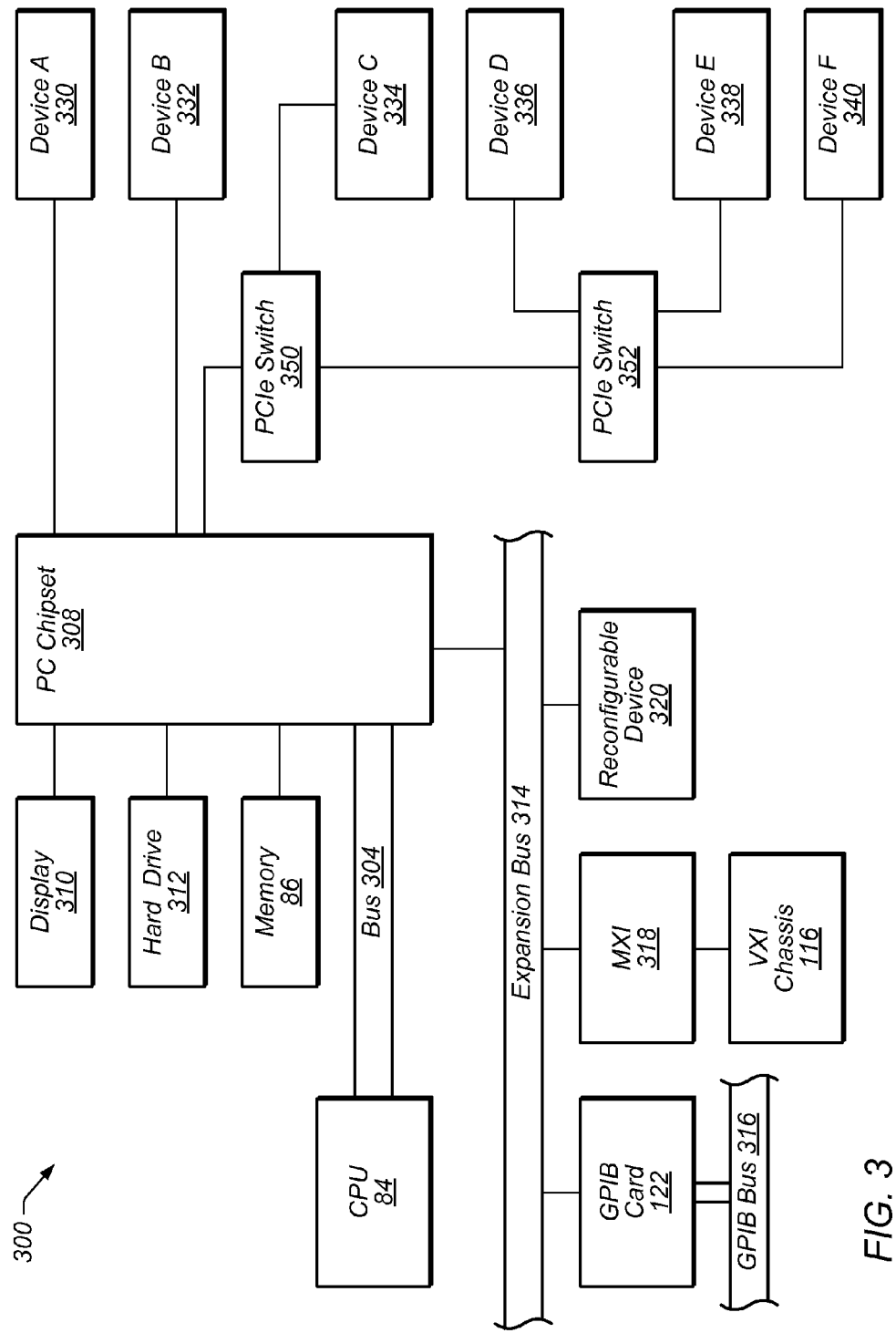
FIG. 3 is a block diagram that illustrates connectivity and buses, of an exemplary system in accordance with one or more embodiments of the present invention.

FIG. 3 illustrates an exemplary computer system 300 that may implement embodiments of the invention. Computer system 300 may be similar to instrumentation system 100 or similar to industrial automation system 160. It may also be noted that computer system 300 may be illustrative of a general-purpose desktop computer system, or a modular (e.g., racked) computer system held in a chassis, or the like. It may also be noted that many types of computer system configuration or architecture may be used as desired, and that FIG. 3 illustrates representative embodiments. Certain elements of the computer system that are not necessary to understand embodiments of the invention have been omitted for simplicity.

Computer system 300 may include at least one central processing unit (CPU) or "processor" 84 that may be coupled to bus 304, for example, a front side bus. CPU 84 may be any of various types, including an x86 processor, a PowerPC processor, a CPU from the SPARC family of RISC processors, as well as others. A memory medium, typically comprising RAM and referred to as memory 86 may be coupled to bus 304 by means of a PC chipset ("chipset") 308. Chipset 308 may include one or more components that function together to provide some of the functions found in modern personal computers. In system 300, chipset 308 may implement a memory controller, expansion bus controller and a host PCIe complex. As noted above, memory 86 may store a programming development environment, e.g., a graphical programming development environment, as well as one or more programs implementing and/or used in embodiments of the present invention. Memory 86 may also store operating system software, as well as other software for operation of computer system 300. Computer system 300 may further include a video display subsystem 310 and hard drive 312 coupled to chipset 308. In embodiments, components shown in FIG. 3 as coupled to chipset 308 (e.g., display subsystems 310 and hard drive 312) may be coupled to an expansion bus.

As depicted, in one embodiment, bus 304 may be coupled to an expansion bus 314 via chipset 308. Expansion bus 314 may be a PCI (Peripheral Component Interconnect) expansion bus, although other bus types may be used. Expansion bus 314 may connect to card slots for the integration of various devices such as those described above. These devices may include GPIB card 122 and a GPIB Bus 316, a MXI interface 318 coupled to a VXI chassis 116, and/or a similar reconfigurable device 320, for instance. In one embodiment, reconfigurable device 320 may include a processor and memory implemented on (e.g., configured on or included in), or coupled to, a programmable hardware element, such as an FPGA. Computer system 300 may be operable to deploy a program, e.g., a graphical program, to reconfigurable device 320 for execution of the program on reconfigurable device 320, with respective portions of the program possibly implemented on the programmable hardware element, and stored in the memory for execution by the processor. Reconfigurable device 320 may be any of a variety of device types, such as those described above with reference to FIGS. 2A and 2B.

In some embodiments, a deployed program may take the form of program instructions, e.g., graphical instructions, or data structures that directly represent the program. Alternatively, the deployed program (or a portion of the program) may take the form of text code (e.g., "C" code) generated from a graphical program. As another example, the deployed program, or a portion of the program, may take the form of compiled code generated from either the graphical program or from text code that in turn was generated from the graphical program. Computer system 82, e.g., via the programming development environment, may be operable to target (e.g., compile) respective portions of the user code for execution by the processor and for implementation as hardware on the programmable hardware element (e.g., the FPGA) as needed to meet performance criteria (e.g., resource use, timing, and I/O constraint criteria), and may be further operable to deploy the portions to their respective targets.

Computer system 300 may support PCI Express. In one embodiment, PC Chipset 308 may directly support a limited number of PCIe devices, but an expanded number of PCIe devices may be supported through the use of PCIe switches. In one embodiment, some (or all) of the attached PCIe devices may be integrated into computer system 300 using printed circuit board (PCB) cards or boards. PCIe devices may vary widely in terms of function. Device types may include input devices (e.g., video capture devices and digitizers), output devices (e.g., arbitrary waveform generators, or secondary storage interface devices), data processors (e.g., data processors used for analysis, test and control) and similar reconfigurable devices. Generally speaking, the types of devices integrated may reflect the intended use of system 300.

Looking now at the exemplary embodiments of PCIe connectivity illustrated in FIG. 3, chipset 308 directly connects to device "A" 330 and device "B" 332. Data may be transferred between devices 330 and 332 by flowing through direct connections made to chipset 308. Chipset 308 also connects to PCIe switch 350. Directly connected to switch 350 are device "C" 334 and PCIe switch 352. Connected to PCIe switch 352 are device "D" 336, device "E" 338 and device "F" 340. PCIe switches 350, 352 may make connections between connected devices so that, for example, device "E" 338 may send data to device "F" through switch 352, without the data going to PCIe switch 350. Note that, in computer system 300, a wide variety of connections may be made through the two switches 350, 352 and through chipset 308. Note that with this topology, multiple data transfers may happen concurrently. For example, device "A" 330 may send data to device "D" 336 via chipset 308 and PCIe switches 350, 352. At the same time device "E" 338 may send data to device "F" 340 via PCIe switch 352. An indirect transfer of data may refer to a transfer of data between devices that includes passing the data to or through a processor or memory of a host processing unit. With respect to devices of system 300, transfers between devices (e.g., peripheral devices) that involve the transfer of data from one peripheral device to another peripheral device through a processor of host CPU (e.g., host CPU 84) or through host memory (e.g., memory 86) may be referred to as indirect transfers. Indirect transfers typically involve two stages, where stage one involves a transfer from a source device to a system host processor/memory and stage two involves a transfer from a system host processor/memory to a target device. An indirect transfer in system 300, for example, may include a data transfer from device "A" 330 to device "C" 334 in two stages. In one embodiment, data is transferred from device "A" 330 to memory 86 (e.g., by device "A" 330 or by host CPU 84) through chipset 308 and then data is transferred from memory 86 to device "C" 334 (e.g., by device "C" 334 or host CPU 84) through chipset 308 and PCIe switch 350. Such an indirect transfer may include a data transfer from a first peripheral device to a second peripheral device where the data is transferred through a processor and/or memory of a host CPU, such as from device 330 to any of the other devices 332-340 through a processor of host CPU 84 and/or memory 86. A direct transfer of data may refer to a transfer of the data between devices without passing the data to or through a processor or memory of a host processing unit. Transfers from one peripheral device to another peripheral device through one or more buses and/or one or more links and/or one or more switches may be referred to as direct transfers, provided data is not routed through a system host processor/memory. In systems where a bus complex is integrated into the same device as a host CPU, transfers through the bus complex portion of the integrated device may still be considered to be direct, provided data is not routed through the processor or memory portion of the CPU device. In one embodiment a direct transfer may include data transfer from a first peripheral device to a second peripheral device via a PCIe Switch, such as from device "D" 336 to device "E" 338 via PCIe switch 352. For example, a direct transfer in system 300 may involve device "A" 330 transferring data to device "C" 334, through chipset 308 and switch 350, without data routing through memory 86 or CPU 84. This may be referred to as a direct transfer as data transferred via chipset 308 is not routed through a processor of CPU 84 and/or memory 86. In some embodiments, host chipsets (e.g., chipset 308) may include functionality similar to a PCIe switch (e.g., switch 350, switch 352). In such embodiments, data routed through chipset 308 may be routed through the PCIe switch portion and may not involve (or indeed pass through) the host CPU (e.g., CPU 84) or host memory (e.g., system memory 86) other host resources. In such embodiments, and in such cases, the transfer of data from one peripheral to another peripheral through chipset 308 may be considered to be a direct transfer as it does not invoke substantial functionality (e.g., processing functionality) of the host controller board or chipset, even though the transferred data may pass through a portion of the host controller board and host chipset. Embodiments similar to that described with respect to computer system 300 may have zero or more PCIe switches, and those PCIe switches may support different numbers of devices.

Figure 4:
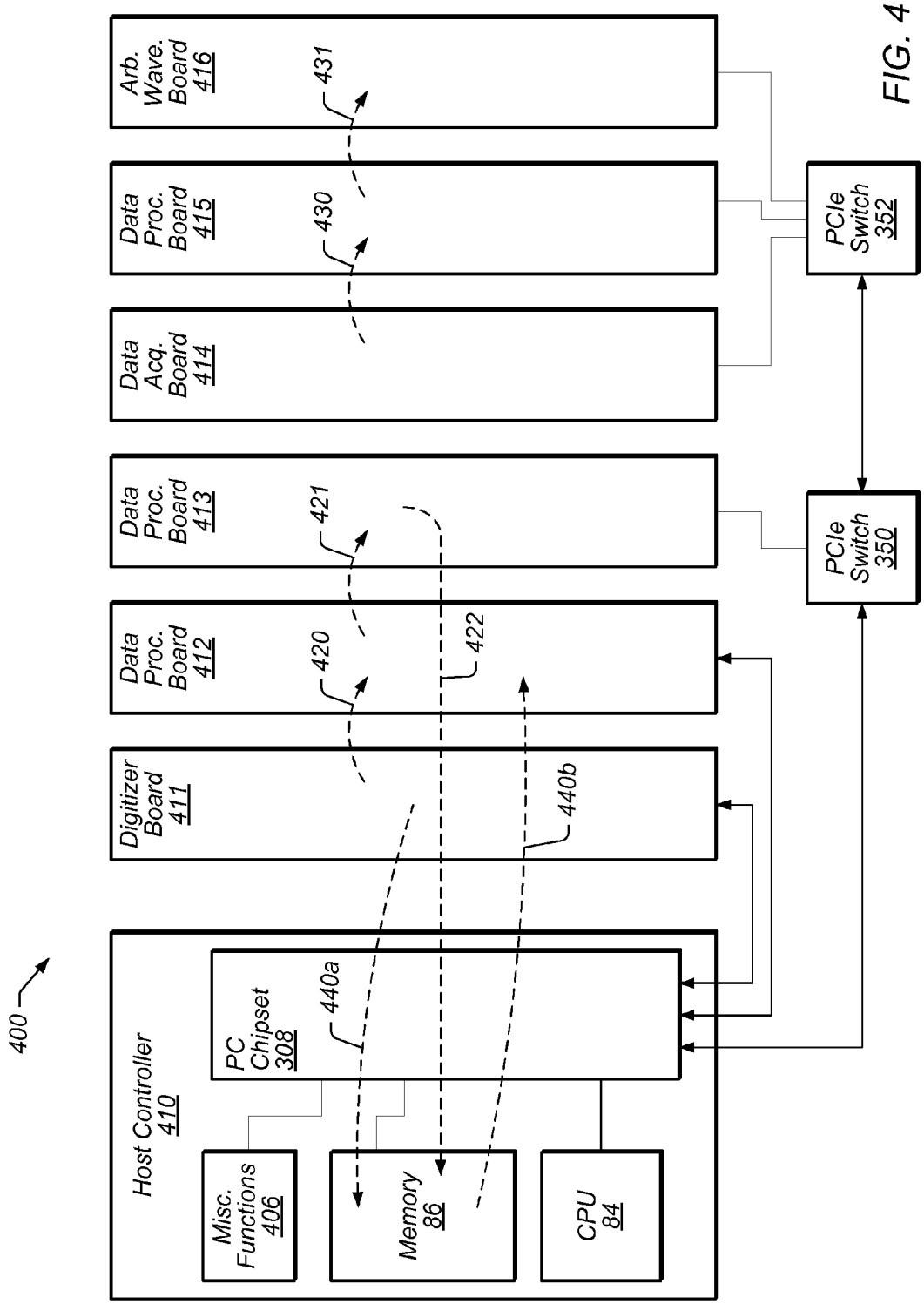
FIG. 4 is a block diagram that illustrates data movement between devices of an exemplary computer system in accordance with one or more embodiments of the present invention.

FIG. 4 is a block diagram that depicts a computer system 400 in accordance with one or more embodiments of the present technique. Computer system 400 may be used for industrial purposes (e.g., test, instrumentation, process control), for instance. Depicted is an exemplary embodiment showing device (e.g., board) level PCIe connectivity and data flow between devices (e.g., between peripheral devices/boards). In the illustrated embodiment, system 400 includes a host controller board 410 having a CPU 84, memory 86, and chipset 308. Other functions that may be found on the host controller board 410 are represented by the miscellaneous functions block 406. Chipset 308 may provide PCIe links to a first peripheral device ("digitizer board") 411, a second peripheral device ("data processing board") 412 and peripheral device interconnect ("PCIe switch") 350. In the illustrated embodiment, directly connected to PCIe switch 350 are a third peripheral device ("data processing board") 413 and a peripheral device interconnect ("PCIe switch") 352. Connected to PCIe switch 352 are a fourth peripheral device ("data acquisition board") 414, a fifth peripheral device ("data processing board") 415 and a sixth peripheral device ("arbitrary waveform generation board") 416. It will be appreciated that the type, number and arrangement of the peripheral devices is merely exemplary and are not intended to be limiting.

Embodiments of system 400 may be used in test and measurement systems, such as systems used to acquire, process or output data relating to a device or process being monitored or controlled, for instance. Accordingly, such a system may acquire data, and subsequently transfer the data for processing, storage, output, or the like. For example, in the case of system 400 being used to control a process (e.g., a closed loop system) data may be acquired, transferred to a processor where it may be processed, and subsequently transferred to an output such that the processed output may be employed to appropriately control the respective process. Often, streams of large amounts of data may be required to ensure data is being transferred at an appropriate rate. Moreover, where devices are used to implement several processes, certain channels for transferring data may include bottle-necks that slow the transfer of data or that otherwise inhibit the performance of the system. For this reason, in some embodiments, it may be beneficial to implement certain regulations relating to the transfers, and/or it may be beneficial to move data directly between the various peripheral devices (e.g., boards) that perform these different functions. For instance, the computer system 400 may support concurrent direct transfers of data between one or more of boards 410-416 via system connectivity.

In some embodiments, data may be transferred from a source (sending) device to a target (receiving) device of system 400. The nomenclature of these devices may be used interchangeably based on the current role of the device (e.g., whether or not the device is sending or receiving data). In the illustrated embodiment, a first set of transfers is indicated by dashed lines 420-422. In the illustrated embodiment, for instance, line 420 may represent data captured by digitizer board 411 that sent via chipset 308 to data processing board 412 for data processing (e.g., filtering to remove noise). Dashed line 421 may represent the transfer of data output from processing board 412 to board 413 for additional processing (e.g., filtering to remove artifacts). Dashed line 422 may represent the transfer of data from processing board 413 to host controller 410 (e.g., for storage of data in memory 86). A second set of transfers, indicated by dashed lines 430 and 431, may be performed independent of and/or concurrent with the first set of transfers 420 and 421. In the illustrated embodiment, for instance, dashed line 430 may represent the transfer of data from DAQ board 414 to data processing board 415 (e.g., for analysis or processing), and dashed line 431 may represent the transfer of data from board 415 to arbitrary waveform generation board 416 (e.g., for outputting an analog waveform). Such transfers (430, 431) may occur via PCIe switch 352.

Note that parts of these transfers may happen concurrently. For example either 430 or 431 may occur concurrently with any of 420, 421, 422 and many other concurrent transfer combinations are possible. Note also that transfers 420, 421, 430 and 431 may be performed as direct transfers (e.g. transfers that do not route data through memory 86. Transfers 420 and 421, while they may route data through the chipset 308, may route data through a host PCIe root complex contained in chipset 308 and may avoid routing data through memory 86. Dashed lines 440a and 440b depict an example of an indirect transfer (or pair of transfers) that may be performed as an alternative to transfer 420. The first stage of this example indirect transfer (depicted by dashed line 440a) is a transfer of data from digitizer board 411 through chipset 308 to memory 86. This transfer stage may be performed by board 411, by CPU 84 or by circuitry on host controller board 410 (e.g., chipset 308). The second part of this indirect transfer (depicted by line 440b) is a transfer of data (e.g., the data moved from board 411) from memory 86 to processor board 412. This transfer stage may be performed by processor board 412, by CPU 84 or by circuitry on host controller board 410 (e.g., chipset 308).

Figure 5A:
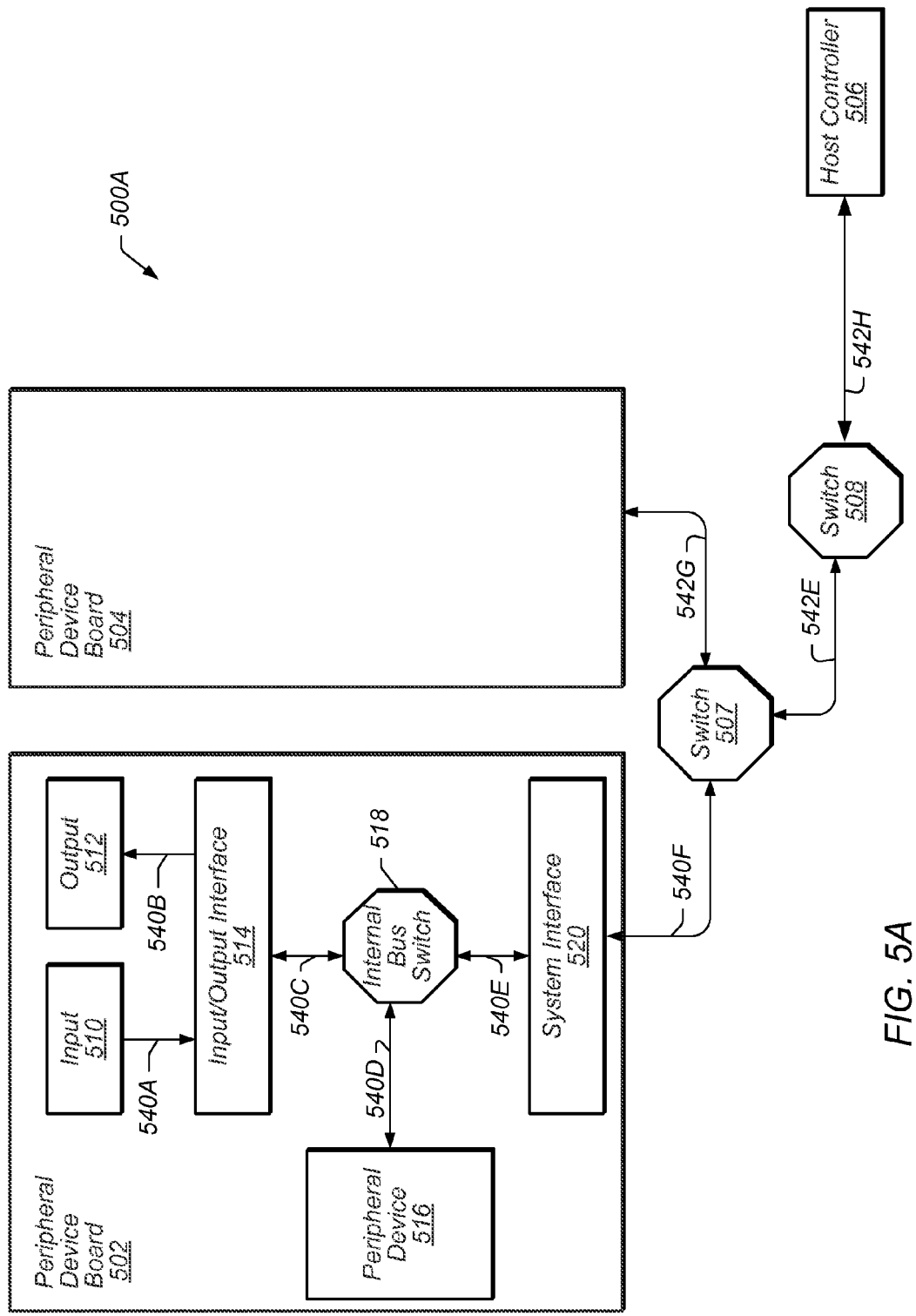
FIGS. 5a and 5b are a block diagrams that illustrate device level connectivity of an exemplary computer system in accordance with one or more embodiments of the present invention.

FIG. 5a is a block diagram representing a portion 500A of a computer system, such as computer system 300 and/or computer system 400. Portion 500A contains three boards, namely, peripheral device board 502, peripheral device board 504 and host controller board 506. These (peripheral device) boards may be connected by interconnect switches 507 and 508. FIG. 5a shows hardware features that may be found on a peripheral device board (e.g., board 502) and data paths that may be utilized within a peripheral device board (e.g., board 502).

In the depicted system, portion 500A is exemplary in nature and that the depicted devices are not intended to infer that certain embodiments may rely upon (or are better suited to) certain illustrated components, classes of illustrated components, certain illustrated functions or combinations of illustrated functions. Further, peripheral device board 502 (and peripheral device board 504) may be similar to one of the depicted devices "A-F" in system 300 and/or may also be similar to one of the depicted boards 411-416 in system 400 and described above with respect to FIG. 4. Additionally, host controller board 506 may be similar to host controller board 410 depicted in system 400 Further, interconnect switches 507 and 508 may be similar to PCIe switches 350 and 352 also depicted in system 400 and described above with respect to FIG. 4.

In some embodiments peripheral device board 502 may contain the following components, namely, input circuit 510, output circuit 512, input/output interface 514, peripheral device 516, data path switch 518 and system interface 520. In some embodiments, input circuit 510 may includes an external input that allows data associated with an external system (e.g., another computer system, device-under-test) to be acquired. For example, in one embodiment, input circuit 510 may be a data acquisition analog input for receiving analog signals. In some embodiments, output circuit 512 may include an external output that allows data to be output from sub-system 500 (e.g., for transmission, display, storage or control). For example, in one embodiment, output circuit 512 may be a data acquisition analog output for outputting analog signals. The input/output interface 514 may be directly connected to input circuit 510 and to output circuit 512 and may serve to facilitate the transfer of data from input 510 and transfer of data to output circuit 512. Interface 514 may be used to convert logic levels, convert signal types, change protocols or otherwise assist in interfacing board 502 to external devices or external systems.

In some embodiments peripheral device board 502 may be considered to be a peripheral board or a peripheral module or a peripheral device. However, board 502 may contain one or more sub-components that may be instrumental in implementing the function of the board. Peripheral device 516 represents such a sub-component (or sub-components). In one embodiment peripheral device 516 may include, for example, a processor, such as a digital signal processor or it may be a device customized to perform a dedicated function such as an application specific integrated circuit. In one embodiment peripheral device 516 may include, for example, a memory space, such as a FIFO buffer. During operation, peripheral device 516 may be used to process, store or perform other functions on the data. For example, processing device 516 may perform processing, such as filtering, of the data on board without having to transfer the data to another device, such as the host CPU or another peripheral device.

In some embodiments, peripheral device board 502 may also contain a system interface 520 that may be suitable for connecting board 502 to a computer system interconnect. The computer system interconnect may be a shared-bus interconnect (e.g., PCI) or a switched point-to-point interconnect (e.g., PCIe) or some other kind of bus (e.g., serial) or it may be an interconnect fabric. Data may be moved on and off peripheral device board 502 through the system interface 520. Depending on the connectivity provided by sub-system 500 and connectivity of the host system that includes sub-system 500, data may be moved from peripheral device board 502 to any other board in the system. System wide data movements will be explained in a description of FIG. 5b.

In the illustrated embodiment, switch 518 may be used to route data on peripheral device board 502. Switch 518 may route data (e.g., data from input circuitry 510 or data from peripheral device 516) through system interface 520 to one or more destinations in the system. For example, data may be routed to host controller 506 via switches 507 and 508. Alternatively, data may be routed to peripheral device board 504 (which could include a processor, for example) via switch 507. In such an embodiment, data may be passed directly, thus bypassing switch 508 and host controller 506. Switch 518 may route data (e.g., data from system interface 520) to peripheral device 516 or to output circuitry 512. In one embodiment, this data may be routed from host controller 506 via switches 508 and 507. Alternatively, the data may be routed from peripheral device board 504 via switch 507.

In some embodiments, data may enter peripheral device board 502 from various locations, and data may leave peripheral device board 502 to various locations, as previously described. In one embodiment, switch 518 on peripheral device board 502 may facilitate data flow from any appropriate source on peripheral device board 502 (e.g., input circuitry 510 and/or peripheral device 516) to any appropriate destination, whether the destination is on the peripheral device board (e.g., peripheral device 516, output circuitry 512) or the destination is elsewhere in the system. System destinations may include a peripheral device (e.g., such as those having a processor) on another peripheral board (e.g., co-processor board 504) or a device on a host controller board (e.g., host controller 506).

In the illustrated embodiment, data may flow from input circuit 510 to host controller 506 as follows. Data may flow from input circuitry 510 to input/output interface 514 via connection 540A (connection 540B may be used for output), to internal switch 518 via connection 540C, through internal switch 518 and to system interface 520 via connection 540E. From system interface 520, data may flow to switch 507 via connection 540F, through switch 507, to switch 508 via connection 542E, through switch 508 and to host controller 506 via connection 542H. In the illustrated embodiment, data may also flow from peripheral device board 504 to peripheral device board 502 as follows. Data may flow from peripheral device board 504 to switch 507 via connection 542G, through switch 507, to system interface via connection 540F, to internal switch 518, through internal switch 518 and to peripheral device 516 via connection 540D. In some embodiments, multiple data flows involving the same boards, same devices and same switches may happen concurrently. For example, in the illustrated embodiment, data may flow from input circuit 510 to host controller 506 while flows from co-processor board 504 to peripheral device 516.

In some embodiments, data received by a peripheral device (e.g., peripheral device 516 of board 502) may be processed by the peripheral device to produce processed data that may be sent by the peripheral device. Peripheral devices (e.g., co-processors) may be used to perform processing on behalf of other devices (e.g., other peripheral devices or host CPUs). In some embodiments, peripheral devices may be "chained" together to perform a sequence of processing functions. In some embodiments a peripheral device may perform a function (e.g., sample an analog signal, communicate with test equipment, read data from storage) or a portion of a function (e.g., filter a portion of an image, perform an initial analysis) or a combination of functions (e.g., decompress an image and format it for display). Also, the output of a processing step/sequence may be sent to one or more peripheral devices in a processing chain. In some embodiments, data transfers between devices may be performed directly (e.g., without routing data through the host CPU or host memory).

Figure 5B:
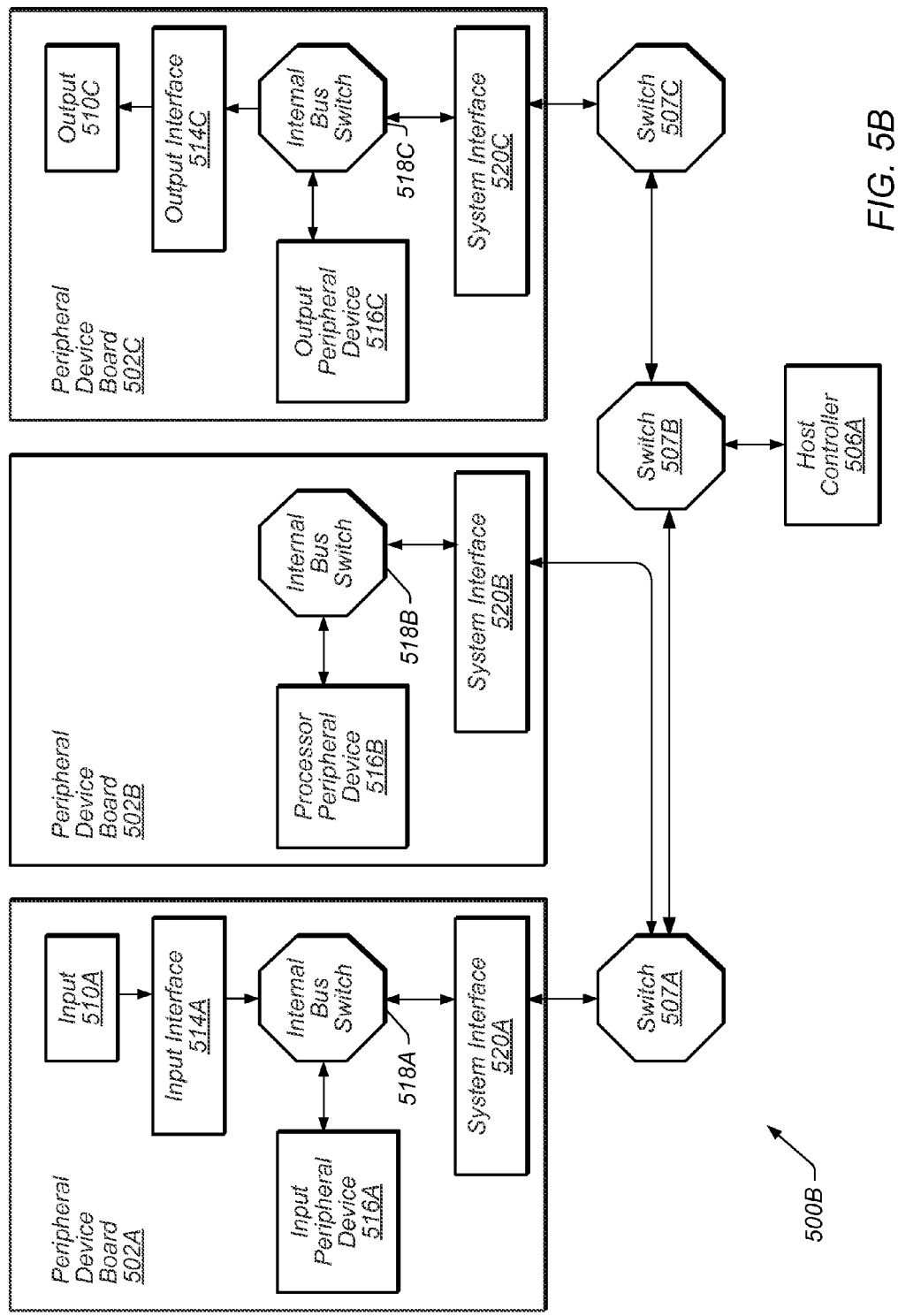

FIG. 5b is a block diagram representing a portion 500B of a computer system that may be similar to computer system 300 and computer system 400 described previously. Portion 500B comprises four boards, namely, peripheral device board 502A, peripheral device board 502B, peripheral device board 502C and host controller board 506A. These boards may be connected by interconnect switches 507A, 507B and 507C.

In some embodiment, boards 502A, 502B and 502C may be similar to peripheral device board 502 depicted in and described with respect to FIG. 5a. As previously mentioned, peripheral device boards may fulfill a variety of functions and consequently, the devices on a certain board may reflect the function (or functions) of the board. In the illustrated embodiment, peripheral device board 502A represents a peripheral input board with depicted input circuitry 510A, input interface 514A and input peripheral device 516A (and no depicted output devices). Peripheral device board 502B represents a co-processor peripheral board with depicted processor peripheral device 516B. Peripheral device board 502C represents a peripheral output board with depicted output circuitry 510C, output interface 514C and output peripheral device 516C. Those skilled in the art will appreciate that there is a wide variety of peripheral boards having various configurations. For example, a peripheral board may include one or more input circuits, one or more output circuits, one or more peripheral devices, or the like.

In some embodiments, such as those depicted by 500B, board 502A connects to switch 507A which, in turn, connects to board 502B and switch 507B. Switches 507A, 507B and 507C may be similar to switch 507 depicted in FIG. 5A. Switch 507B connects to switch 507C and also to host controller 506A that may be similar to host controller 506 depicted in and described with respect to FIG. 5A. Lastly, switch 507C connects to peripheral device board 502C.

In some embodiments, such as those depicted by 500B, peripheral device boards 502A, 502B and 502C may form one or more processing chains in which data may be transferred between peripheral components on the boards via internal bus switches (e.g., 518A, 518B and 518C) and external switches (e.g., 507A, 507B and 507C). In certain embodiments, the transfer of data between peripheral boards/devices may be performed directly, that is, without routing data through the host CPU or host memory.

In some embodiments, such as those depicted by 500B, a first processing sequence may operate as follows. Data may be input (e.g., from sampling equipment) via input circuitry 510A and may flow to input peripheral device 516A through input interface 514A and internal bus switch 518A. The input peripheral device 516A may process none, some, or all of this input data (e.g., perform a filtering operation) and may send output data to output peripheral device 516C via elements 518A, 520A, 507A, 507B, 507C, 520C and 518C. The output peripheral device 516C may process none, some, or all of the data sent from 516A to produce new output data (e.g., equipment control messages) and send this new data via internal bus switch 518C, output interface 514C to output circuitry 510C (e.g., to output a signal for controlling equipment). In the first processing sequence, peripheral board 502A (e.g., input board) exchanges data directly with peripheral board 502C (e.g., output board) using switches 507A, 507B and 507C. The first processing sequence may, for example, be used to analyze and control equipment and may perform this function without routing data through host controller board 506A. In such an embodiment, a first peripheral device may directly transfer data to a second peripheral device, and the second peripheral device may process at least a portion of the data using an onboard processor.

In some embodiments, a second processing sequence may be employed when, for example, additional processing of data may be beneficial. This second processing sequence may be performed in a similar manner to the first sequence, subject to appropriate system configuration. In some embodiment, the system may be dynamically configurable. Dynamically configurable may refer to the system being capable of having its configuration modified, e.g., by a user at of before run time. In some embodiments, dynamically configuring the system may include specifying/modifying the paths/routes for data transfers to occur and/or specifying/modifying how and where processing may occur. The user of an embodiment may determine the processing functions to be performed by the embodiment and the user may also determine the devices/boards to be used, perhaps through an enabling application. After determining the function to be performed and devices to perform the function, the system may (perhaps with user input) configure peripheral devices, peripheral boards and link switches so that the employed devices may transfer data to from one device to another to offload processing between the devices. This configuration may involve sending configuration information to entities such as devices or boards or switches. On receiving such configuration information, entities may be configured or configure themselves to perform the intended function and share data in the intended fashion.

In the second processing sequence (or processing chain), data may be routed to/from peripheral device board 502B for processing by processor peripheral device 516B. This second processing sequence may operate as follows. Data may be input (e.g., from sampling equipment) via input circuitry 510A and may flow to input peripheral device 516A through input interface 514A and internal bus switch 518A. The input peripheral device 516A may process this input data (e.g., perform a filtering operation) and may send output data to processor peripheral device 516B via elements 518A, 520A, 507A, 507B, 520B and 518B. The processor peripheral device 516B may process this received data (e.g., perform pattern recognition) and generate output data (e.g., simplified 2D representation). Processor peripheral device 516B may send a portion of the data it generated to output peripheral device 516C via elements 518B, 520B, 507A, 507B, 507C, 520C and 518C. In one embodiment, at least a portion of the data sent from 516B may be processed by output peripheral device 516C to produce new output data (e.g., equipment control messages) and send this new data via internal bus switch 518C, output interface 514C to output circuitry 510C (e.g., for outputting a signal to control equipment). The second processing sequence may, for example, be used to analyze and control equipment and may perform this function without routing data through host controller board 506A. In one embodiment, a portion of the data may be sent from device 502B back to board 502A via elements 518B, 520B, and 507A (e.g., for additional processing or output where board 502A includes an output, for instance).

Certain embodiments may incorporate sub-systems similar to the depicted subsystem 500B. These embodiments may include multiple peripheral boards (e.g., co-processor boards) that are similar to peripheral device board 502B. In such embodiments, multiple peripheral boards may operate together to perform a function. Data may be sent from an input peripheral device board (e.g., similar to 502A) to multiple peripheral boards. In some embodiments, a certain portion of data may be sent to multiple boards. For example, in an embodiment with four co-processor peripheral device boards, an entire image may be sent, perhaps in broadcast fashion (e.g., in parallel), to each of the four co-processor boards, so that, for example, each device could perform a separate image processing function on the image. Transferring data in parallel may refer to transferring data from one device to multiple devices non-sequentially, e.g., from device A to device B and from device A to device C. Parallel transfers may or may not occur simultaneously. Transferring data in series may include transferring from one device to multiple devices sequentially, e.g., from device A to device B and from device B to device C. In some embodiment, processing may occur in parallel, e.g., in two device may process data independent of one another. For example device A and device B may both process data independent of one another, and the processing may or may not occur simultaneously. In one embodiment, processing may occur in series, e.g., sequentially in two or more devices. For example, device A may process data and passing the processed data to device B for subsequent processing. Alternatively, in an embodiment with four co-processor peripheral device boards, data for a quarter of an image may be sent to each of the four co-processor boards, so that, for example, each device could perform image processing on a quarter of the image.

Figure 6:
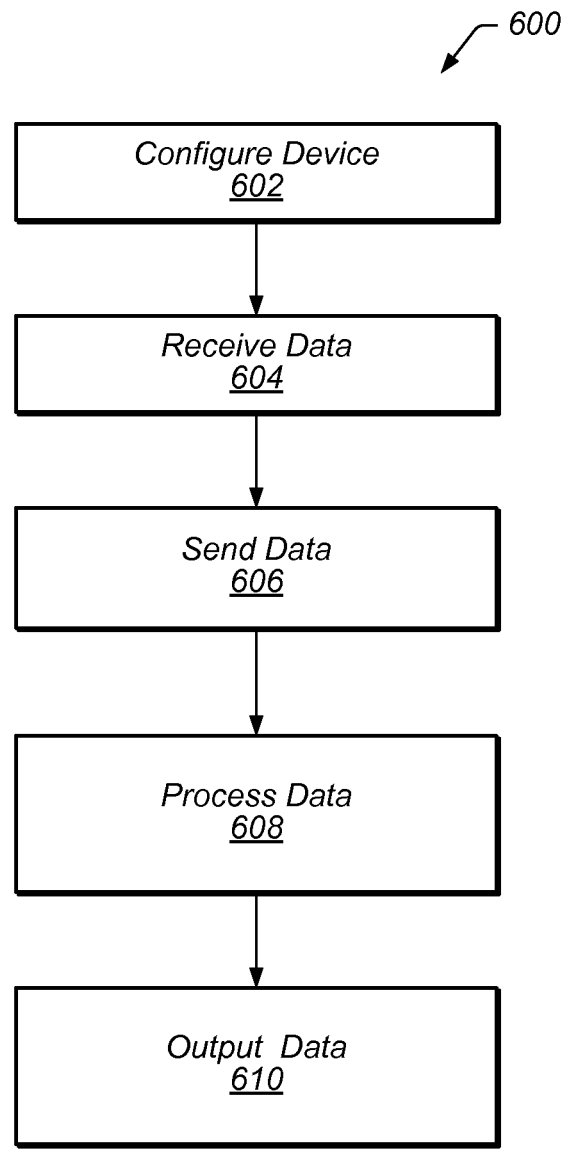
FIG. 6 is a flowchart that illustrates a method for transferring and processing data in accordance with one or more embodiments of the present invention.

FIG. 6 depicts a flow chart of an exemplary method 600 offloading data to another device for processing, in accordance with one or more embodiments of the present techniques. In some embodiments method 600 starts with a configure device step as depicted by block 602. This step may involve configuring one or more devices in a computer system, in accordance with any of the techniques described herein. For example, a configuration may dictate that data be distributed from one device to another for processing, in accordance with any of the techniques described herein as well as any potential path with the described system. A device may be configured automatically by a host system and it may be configured with user input that, in turn, may be obtained from a human interface device. Some embodiments may display information (e.g., diagrammatic information) relating to a task, process or function and some embodiments may also display information about one or more system devices that may be involved in a task, process or function. A system user may read such displayed information and may select devices and configure those devices (e.g., configure how data is shared between the devices) for a chosen task or tasks. Device configuration may involve, for example, arranging for a device to perform a particular task (e.g., filtering an image) or a portion of a particular task (e.g., filtering a portion of an image) or a group of tasks (e.g., filtering an image and compressing an image). In one embodiment, the transfer paths of data may be configured. For example, a device may be configured to receive data from a particular device (e.g., an input device such as a digitizer), a portion of data (e.g., a quarter of the data) from a particular device or portions of data from various devices. A device may also be configured to send a portion (e.g., 100%, 25% or 10%) of data to a particular device (e.g., a processing peripheral device). Additionally, a device may be configured to broadcast data to multiple devices. For example, in one embodiment, a device may be configured to send an image to two co-processing devices in parallel so that two different filters may be performed on the same image. A device may be configured to send data to various types of devices for a variety reasons. For example, a device may be configured to send data to an output device for display, to an output device for control, to a host controller for storage, to a communications device, to a reconfigurable device for processing or to an inter-mediate device for forwarding to a destination device and so on.

In some embodiments, data may be sent from one device to another device via point-to-point links that may be connected by one or more switches (e.g., PCIe switches). In some embodiments a switch (or switch functionality) may reside on a system chassis or on a host controller board or on a peripheral device expansion board. Switch functionality may be integrated onto devices such as PC chipset devices, controllers, interface circuits, bus converters or peripheral devices. Since switches may affect the routing of data, configuring the system for sharing data may also, in some embodiments, involve configuring one or more switches.

In some embodiments method 600 may include a receive data step as depicted by block 604. This step may involve a device receiving data from one or more sources. Data may be received from various types of devices. Depending on the embodiment, data may be received from an external input, such as that of an input device (e.g., a digitizer, video source), data may be received from an internal input, such as directly from another peripheral device (e.g., a peripheral co-processor device) or indirectly via/from a host device (e.g., a system host controller). In some embodiments, a device may receive a portion of data from a number of devices. For example, in one embodiment, an image processing device may receive the upper half of an image from a first device and the bottom half of an image from a second device.

In some embodiments method 600 may also include a send data step as depicted by block 606. This step may involve a source device sending data to one or more target devices. Data may be sent to various types of devices. Depending on the embodiment, data may be sent to an output device (e.g., a graphics display controller) or data may be sent to a processor device (e.g., a peripheral co-processor device) or data may be sent to a host device (e.g., a system host controller), perhaps for storage purposes. In some embodiments, a device may send data to a number of devices. For example, in one embodiment, an input device may send the upper half of a captured image to a first device (e.g., for filtering) and the bottom half of the captured image to a second device (e.g., for filtering). In certain embodiments, data may be sent in a broadcast fashion (e.g., sent to multiple targets, perhaps simultaneously). For example, in an embodiment where three different image processing filters are to be performed using three separate processing devices, an image capture device may broadcast data for one image to the three devices.

Depending on the embodiment, the data that is sent may be partially processed or unprocessed or fully processed. The sent data may be related to data that was previously received or it may be a portion of received data or it may be unrelated to received data. In some embodiments, data may be sent from a first device to second device and then data may be sent from the second device to a third device and so on and so forth, so that a sending and receiving chain of devices is formed.

In some embodiments method 600 may also include a process data step as depicted by block 608. The process data step 608 may depend on the embodiment and depend on the processing device (or devices). For example, step 608 may involve a device fully processing a portion (e.g., 100%, 50%, 10% etc.) of the data to be processed and it may involve a device partially (e.g., 100%, 25%, 5% etc.) processing a portion of the data to be processed. Processing may be performed, for example, by input devices, co-processor devices, reconfigurable devices, dedicated devices, custom devices or general purpose processing devices and so on. In some embodiments, multiple devices may be used to perform one processing step. In certain embodiment, this may be achieved, for example, by dividing data among multiple processing devices or it may be achieved by dividing the processing step among multiple processing devices. In some embodiments, some devices may be involved in the processing of data but may not actually process data. For example, some devices (e.g., input devices) may acquire data and send the acquired data to another device which may process the sent data.

In some embodiments method 600 may also include an output data step as depicted by block 610. Data may be output for a variety of purposes. For example, data may be output for display purposes or for storage or for external control or for transmission or for other purposes. Various types of data may be output, for example, output data may include partially processed data and/or fully processed data. Depending on the embodiment, data may be output by multiple devices or by a single device.

The methods illustrated by flow chart 600 may include steps 602, 604, 606, 608 and 610 in the depicted order. However, those skilled in the art will appreciate that in some embodiments some of these steps may occur in a different order. For example, in some embodiments, receiving devices may process data before sending data. Those skilled in the art will also appreciate that in some embodiments (e.g., data acquisition systems) a portion of the depicted steps (602-610) may essentially occur concurrently and a portion of the depicted steps may also occur repeatedly With respect to FIGS. 1 through 6, various embodiments relating to the transfer of data have been depicted and described. For example, embodiments that support the direct transfer of data between peripheral devices without routing data through a host controller have been described. Those skilled in the art will therefore appreciate that embodiments of the invention may benefit from an efficient mechanism for transferring data between peripheral devices. FIGS. 7 through 10, together with accompanying text, describe embodiments of a mechanism for such peripheral device to peripheral device data transfers.

Figure 7:
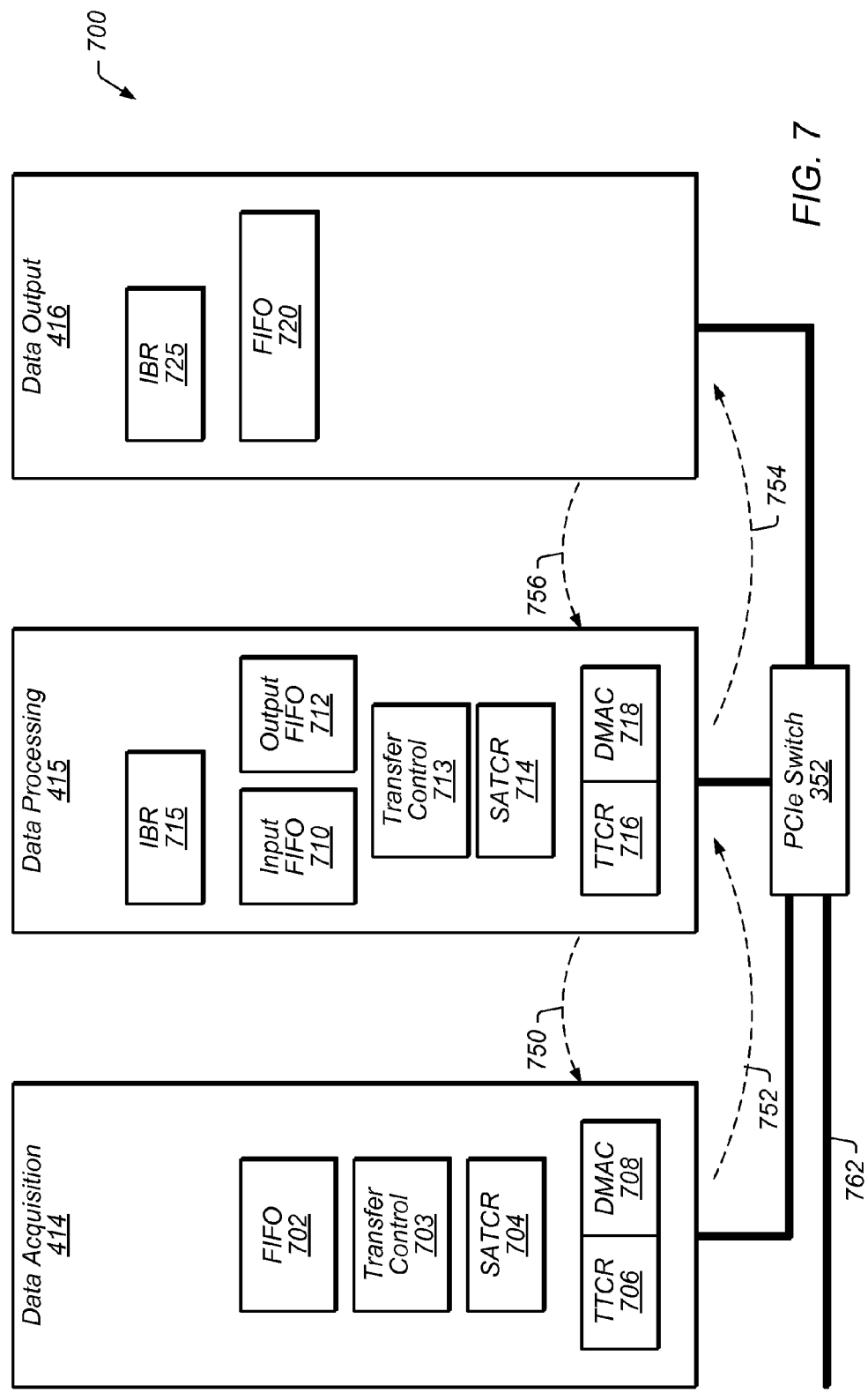
FIG. 7 is a block diagram that illustrates a portion of an exemplary computer system in accordance with one or more embodiments of the present invention.

FIG. 7 is a block diagram representing an exemplary portion 700 of system 400 illustrated in FIG. 4. In the illustrated embodiment, exemplary portion 700 includes three devices: data acquisition board 414, data processing board 415 and data output board 416. Note that other embodiments may have different combinations of boards and different types of devices. For instance, embodiments may include combinations of peripheral devices or combinations of one or more host devices and peripheral devices. In certain embodiments, one or more portions of the devices) may be integrated onto a single device, such as multiple PCIe devices and/or PCIe switches integrated into single modular peripheral device.

Embodiments of the invention are not limited in terms of the physical design of the computer system or in terms of the functions of the PCIe devices.

In one embodiment, DAQ board 414 may include an input device that receives data, and thus may be a source of data to be processed and output by sub system 700. For example, DAQ board 414 may include a digitizer that receives an analog electrical signal, and digitizes the signal into computer readable data ("data"). In one embodiment, the data may be stored or processed on DAQ board 414. In one embodiment, the data may be transferred to another portion of the computer system for storage at another location and/or processing at another location within the system. For example, the data may be transferred to the system host (such as host controller 410, which is not depicted but may be connected via PCIe link 762) and/or another peripheral device, such as data processing board 415. The transfer of data may include "indirect" or "direct" transfers of the data between devices. As discussed briefly above, in order to allow the system to operate reliably it may be beneficial to implement devices and techniques to regulate the transfer of data between devices, such as the streaming of data between devices.

In the illustrated embodiment, DAQ board 414 may include a buffer ("FIFO") 702 for managing the flow of data being captured and being transferred. Data may be transferred using direct memory access controller (DMAC) 708 which may be programmed to automatically transfer data. In one embodiment, DMAC 708 may be programmed by transfer control logic 703. The transfer control logic 703 may determine the characteristics data transfers including, whether or not a transfer should be initiated. Transfer control logic may be coupled to FIFO 702.

As depicted in FIG. 7, DAQ board 414 may also include two registers, a stream additive transfer count register (SATCR) 704 and a total transfer count register (TTCR) 706. SATCR 704 may include a mechanism used to control the initiation of data transfers. For example, SATCR 704 may be associated with and/or monitor a SATCR value indicative of whether or not a source ("sending") device should initiate a transfer of data to a target ("receiving") device. As discussed in more detail below, the SATCR value associated with SATCR 704 may be indicative of the number of bytes that a receiving device is able to receive. For example, the SATCR value may be written by software and/or hardware and may be adjusted (e.g., decreased/increased) by hardware as data transfers are initiated by board 414. In one embodiment, the amount that the SATCR value is decreased/increased may correspond to the byte count of the data transfer being initiated. In one embodiment, transfer control logic 703 may be configured to initiate transfers only as long as the SATCR value is above a certain threshold, thereby helping to ensure that the receiving device is capable of receiving the amount of data being sent. In other words, control logic 703 may be configured to not initiate data transfers that may cause the value of the SATCR 704 to drop below a threshold (e.g., zero) to help ensure that there is enough space for the data at the receiving device, thereby helping to prevent data over-run at the receiving device. Note that, depending on the embodiment, the value of transfer credits may be represented in different ways. For example, in one embodiment, an increase in the value of transfer credits may equate to an increase in a corresponding number. In another embodiment, an increase in the value of transfer credits may equate to a decrease in a corresponding number. Transfer credit threshold values may be set according to the embodiment and according to the representation of transfer credits used in that embodiment. So, for example, in some embodiments the value of transfer credits dropping below a threshold may actually correspond to an associated number rising above a threshold.

Due to the latency involved, the performance of sub system 700 may be impacted if software were to programmatically pause data transfers in order to write/update a new value to SATCR 704. Such a pause may be attributed to software writing a control bit to pause hardware transfers, reading the current SATCR value of SATCR 704, and then writing an updated value before un-pausing the hardware. The pausing transfers may be expected by those skilled in the art since the SATCR may be adjusted both by circuitry (e.g., as data is transferred) and also by software writes (e.g., by a target device granting more transfer credits). Since it is possible that two adjustments may be made coincidentally, some kind of adjustment error or problem may be anticipated. However, in some embodiments the SATCR may have associated circuitry that prevents problems arising from a coincidence of software and hardware adjustments. In one embodiment, values written to SATCR 704 may be automatically added to the current value via hardware. Such a method may allow writes (e.g., originating in hardware or software) to continually increase the amount of data that hardware is enabled to transfer by simply writing directly to SATCR 704 for each update. In such an embodiment, SATCR 704 may be updated via communication between two hardware devices. Thus, updates may occur before the register reaches zero and hardware may be stalled only when desired, such as when synchronizing hardware with software. In such an embodiment, a sending device (e.g., board 414) may monitor the SATCR value of the SATCR 704 which has been updated based on signals/values received directly from a receiving device (e.g., board 415) depicted in the dotted line 750, such that the two peripheral devices may regulate the transfer of data between them without transferring such flow control information using a host device or through host controller memory.

When using a SATCR 704 as described above, register accesses from software may be reduced to a single write per target device update. Further, transfers (e.g., DMAC-based transfers) may be decoupled from software's flow control mechanism such that unnecessary stalls are reduced.

In one embodiment, TTCR 706 may be used to track the amount of data sent/transferred by a device. For example, TTCR 706 may include a readable status register that may provide a total byte count of the data that has been transferred since the beginning of one or more DMA operations. In some embodiments, reads of this register are coherent such that the value returned may be immediately acted upon without any further synchronization steps. For example, a TTCR of a sending device, such as board 414, may be read to determine how much data has been sent to a receiving device, such as board 415. The coherency of a TTCR register may enable the data associated with TTCR to be read by the receiving device with minimal or no further synchronization steps. The coherency also allows the sending device to immediately free or reuse locations associated with the data that the TTCR indicates has been sent.

In some embodiments, system 400 and/or sub-system 700 may implement a technique known as "DMA Progress Status Pushing" (DPSP). Such a technique may include automatically writing (e.g., via hardware) the TTCR value (e.g., TTCR 706) to a specific location where it may be read. This location may be in a memory (e.g., memory 86) or it may be in a memory or a register on the target device (e.g., board 415), for example. The hardware may write every time a predetermined (e.g., fixed and/or programmable) amount of DMA data bytes have been transferred. This may avoid some costly hardware register reads of TTCR and may allow driver software to monitor DMA progress by reading the information from a more convenient location. Like reads of TTCR referred to in the previous section, in one embodiment, a status push of TTCR is guaranteed to be coherent with the data being sent to the same destination. The reader of the status pushed TTCR may act immediately on the TTCR value. The hardware may also be capable of "pushing" (e.g. writing) the TTCR value at the end of a transfer operation since the end may not coincide with a multiple of the programmed DPSP byte count. A bit in the pushed value may be used to distinguish between pushes that were triggered by the programmed byte count being transferred and the push at the end of an operation.

Both reads of TTCR and DMA Progress Status Pushing may be employed in situations where a controller desires to query DMA progress. In one embodiment, interrupts may notify a controller when DMA progress is made. For example, in one embodiment, a technique referred to as "Every N Notification" (ENN) may be used to interrupt a controller each time a fixed and/or programmable number of bytes have been transferred. In one embodiment, this feature may be combined with DMA Progress Status Pushing so that, for each interrupt, the controller may obtain updated status about DMA progress without performing a read of a TTCR on the sending device. As with DMA Progress Status Pushing, the control hardware associated with ENN may also generate an interrupt at the end of a transfer operation since the end may not coincide with a multiple of the programmed ENN byte count.

Some embodiments may involve interrupting a controller (e.g., a host CPU or a peripheral controller) when a specific number of bytes have been transferred. Instead of interrupting on a regular basis a device controller may wish to specify a particular byte count and receive an interrupt at that point. The number of bytes that the device controller specifies may vary during operation. A Total Transfer Count Compare Register (TTCCR) may allow a controller to specify a total byte count at which an interrupt is desired. In one embodiment, the TTCCR may be hardware based. In such an embodiment, hardware may generate an interrupt when an associated TTCCR reaches a value associated with the specified byte count. After receiving the interrupt the controller may be free to specify another value for subsequent notification.

Some embodiments may support a feature with similar functionality to ENN. Certain embodiments may include additional circuitry on sending and receiving devices. In one embodiment, a technique referred to as "Every N Doorbell" (END) may include a hardware initiated write of a programmable data value to a specific address every time a predetermined (e.g., fixed or programmable) number of bytes have been transferred. The specific address may correspond to a register location on a receiving device. In one embodiment, hardware on the receiving device may, on detecting a write to the register at the specific location, cause an interrupt to be sent to an associated controller. In certain embodiments (e.g., embodiments with a system interconnect based on PCIe) doorbell functionality may be advantageous if the bus protocol associated with system interconnect provides limited dedicated or explicit means for one peripheral device to interrupt another peripheral device. In such embodiments, doorbell functionality may be advantageous even when the system interconnect provides an interrupt mechanism directed at a host CPU.

A register that generates an interrupt when the register is written may be referred to as a "doorbell". Some embodiments may include a doorbell register. In one embodiment, a write to a doorbell register may be coherent with transmitted data at a target device. For example, in one embodiment, a doorbell may generate interrupts to a co-processor target device that may be coherent with received data in the co-processor's memory. In one embodiment, DMA Progress Status Pushing may be combined with the END technique so that the coprocessor may quickly retrieve a progress status from its local memory with each doorbell interrupt. In one embodiment, a doorbell write may also be initiated at the end of a data transfer operation where the quantity of data transferred may not be a multiple of the predetermined N byte count. Similarly, in one embodiment DMA Progress Status Pushing may occur at the end of a data transfer operation and the pushed value may include a bit that may be used to distinguish between a push that was triggered by a multiple of N and a push that was triggered by the end of the data transfer operation.

In one embodiment, a first value in a TTCCR may be over written with a smaller second value before an interrupt corresponding to the first programmed value is generated. Such a technique may allow a peripheral controller, for example, to be notified at an earlier point in the data stream than may have been previously specified. Some embodiments may include preventing the overwriting of a first value in a TTCCR with a larger second value before an interrupt corresponding to the first programmed value is generated. This may help to avoid a race condition. In such embodiments software may be restricted to waiting until a previously programmed interrupt is received before trying to program a new value.

Looking now at the processing of data and the movement of data between devices, in one embodiment, multiple devices, such as the three boards (414, 415 and 416) of sub-system 700, may form a processing chain. For example, the devices may acquire data, processes data, and generate an output. Using techniques, such as those described herein, large quantities of data (e.g., many giga bytes or tera bytes) may be moved between the boards as the processing steps in the chain are performed. In addition, sub-system 700 may perform a large number of simultaneous data movements during operation within system 400.

As discussed above, in one embodiment, DAQ board 414 may include an input device that receives data, and thus may be a source of data to be processed and output by sub system 700. For example, DAQ board 414 may include a digitizer that receives an analog electrical signal, and digitizes the signal into computer readable data ("data"). In one embodiment, the data may be stored or processed on DAQ board 414. For example, the data may be stored in FIFO 702 of DAQ board 414 in preparation for sending to data processing board 415. In one embodiment, the data transferred to DAQ board 415 is transferred into an input FIFO 710. In one embodiment, when there is adequate space in input FIFO 710 of board 415, board 415 may write (as indicated by 750) to SATCR 704, in order to grant board 414 the ability to transfer data. As referred to herein, "transfer credits" may be used to describe the amount of data the receiving device has allotted or otherwise given permission for the sending device to transfer to the receiving device. In one embodiment, credits may include a number of bytes a sending device may transfer to the receiving device based on free space available in a buffer of the receiving device. For example, where the receiving device has 128 bytes of free space and a transfer credit is indicative of 1 byte, 128 transfer credits may be provided to the sending device to indicate that it may send 128 bytes to the receiving device. During use, multiple transfer credits and/or sets of transfer credits may be issued to the sending device such that they are accumulated. The total number of transfer credits currently available to the sending device may be referred to as the "accumulated transfer credit value." The total accumulated transfer credit value may be increased as additional transfer credits are issued from the receiving device, and reduced as data is sent, using at least a portion of the issued transfer credits.

In one embodiment, transfer control logic 703 may determine that sufficient transfer credits have been granted for a data transfer to take place. In one embodiment, if it is determined that sufficient transfer credits have been granted, transfer control logic 703 may enable DMAC 708 to transfer data to data processing board 415, for example. DMAC 708 may then transfer data to input FIFO 710. In one embodiment, the transfer of data may occur directly via a PCIe point-to-point link connected at PCIe switch 352. In one embodiment, DAQ board 414 may write (as indicated by dashed line 752) data transfer information (e.g., the value of TTCR 706) to location Input Bytes Received (IBR) 715 to communicate transfer progress to board 415. Data processing board 415 may use the value of IBR 715 to determine how much data it has received. Data processing board 415 may determine the quantity of received data and then may read the exact or an associated amount of data out of input FIFO 710 for processing, freeing up space in FIFO 710 as the data is read. As board 415 performs these actions it may grant more data transfer credits (by writing to SATCR 704 as indicated by dashed line 750) for the newly freed space in FIFO 710. Thus, as space is freed in the FIFO of the receiving device (e.g., board 415), the receiving device may dynamically issue transfer credits to the sending device 414. Transfer control logic 703 may monitor SATCR 704 for additional credits and if it determines that sufficient additional credits have been granted, it may send additional data to DMAC 708 to be transferred to board 415. Such a technique may enable a stream of data to be transferred between the devices.

In one embodiment, data processed by board 415 may remain on board 415 and/or it may be transferred to another device or location for processing, storage, output, or the like. In one embodiment, for instance, data processed by board 415 is placed in output FIFO 712 in preparation for transfer to data output board 416 for output (e.g., via an external connection to a DUT or process 150 as described with respect to FIGS. 2A and 2B). Similar to the above described embodiments, data output board 416 may determine if there is sufficient space in FIFO 720 and may grant transfer credits accordingly to board 415 by writing (as indicated by dashed line 756) to SATCR 714. Transfer control logic 713 on data processing board 415 may determine that the accumulated transfer credit value is sufficient for a data transfer and enable the DMAC 718 to transfer data to FIFO 720. The DMAC 718 may transfer data by sending data directly to FIFO 720 of output board 416 via PCIe switch 352. In one embodiment, data processing board 415 may write (as indicated by dashed line 754) data transfer information (e.g., the value of TTCR 716) to location Input Bytes Received (IBR) 725 to communicate transfer progress to board 416. Data output board 416 may read/output data from FIFO 720 (e.g., to an output) and, as data is read, more space is freed in FIFO 720, thereby enabling data output board 416 to grant additional transfer credits to data processing board 415 (as indicated by 756). In response to receiving more transfer credits from data output board 416, the accumulated transfer credit value may increase. This may, in one embodiment, enable transfer control logic 713 to transfer more data from output FIFO 712 to DMAC 718 to be transferred to FIFO 720.

Figure 8:
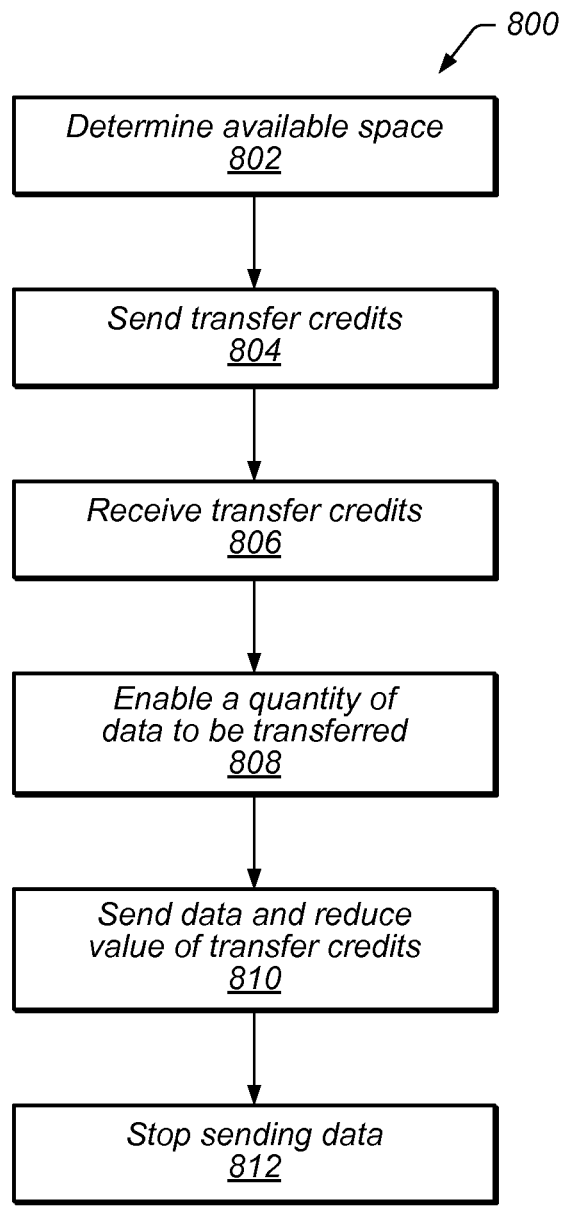
FIG. 8 is a flowchart that illustrates transferring data in accordance with one or more embodiments of the present invention.

Turing now to FIG. 8, depicted is a flow chart of an exemplary method 800 for transferring data between a source device and target device, in accordance with one or more embodiments of the present technique. As depicted at block 802, method 800 may include determining available space. For example, in one embodiment, method 800 may include a target peripheral (e.g. one that may be configured to receive data), determining how much storage space is available (e.g., space available in a FIFO or in a RAM) for receiving data. In one embodiment, the determining of available space may be performed by a device acting on behalf of a target device, such as a controller associated with the target peripheral or a host CPU.

In the illustrated embodiment, method 800 also includes sending transfer credits, as depicted at block 804. In one embodiment, the target device (or a device acting on behalf of the target device) may send transfer credits to a source device that may be configured to send data. This may occur after determining available space at block 802, as depicted in the illustrated embodiment. The amount/value of transfer credit sent by the target device may depend on various factors. For example, in some embodiments, the number of transfer credits issued may be based on the amount of available space determined at block 802, the amount/value of transfer credits previously sent, and/or the quantities data previously received and/or processed at the receiving device. In one embodiment, the number of transfer credits issued may be the same or at least based on the amount of free space available in a buffer of the receiving device. For example, in one embodiment, if a receive FIFO has 256 bytes of storage space for receiving data and 128 bytes have already been received, the receiving device may grant an additional transfer credit of value 128 bytes.

In the illustrated embodiment, method 800 may also include receiving transfer of credits, as depicted at block 806. In one embodiment, a source device may receive transfer credits sent at block 804. For example, a target device may grant a transfer credit of value 4096 bytes, by writing a value corresponding to 4096 bytes to a specific location on a source device. In the illustrated embodiment, method 800 also includes enabling a quantity of data to be transferred as depicted at block 808. In one embodiment, the quantity of data enabled to be transferred may correspond to an accumulated transfer credit value. In one embodiment, a source peripheral may enable a quantity of data (e.g., based on the accumulated transfer credit value) to be transferred to a target device. In one embodiment the enabling process may involve configuring a DMAC to perform data transfers. In one embodiment, enabling may involve allowing transfer requests to be sent to a DMAC.

In the illustrated embodiment, method 800 further includes sending data and reducing the current value of transfer credits as depicted at block 810. Note that, in some embodiments, data may be sent in accordance with the operation of a bus governor. In such embodiments, a bus governor may be used to limit the utilization of a bus that a particular device or particular module or particular board may obtain over a specified period of time. In one embodiment, a bus governor may be controllable by software and may allow software to specify a level of bus utilization that a device may obtain and may also allow software to specify the interval over which bus utilization is measured and controlled. For example, a bus governor may be used to specify a rate, duration, period, and/or frequency at which a device may transfer data across a bus. In one embodiment, a bus governor may operate on a shared backplane bus (e.g., PCI) of a computer system. In another embodiment, one or more governors may operate on one or more point-to-point links, such as is found in PCIe-based systems. Such a technique may help to ensure that certain devices do not dominate a shared bus (or shared link), thereby preventing other devices from sufficient access to the shared bus.

In one embodiment, the current value of transfer credits may be reduced according to the quantity of data sent. For example, a source device may send data to a target device and may decrement the allocated transfer credit value according to the quantity of data sent. In one embodiment, the transfer credits and/or accumulated transfer credit value may be stored in a counter, and the counter may be progressively decremented as each data item is transferred to the receiving device.

In one embodiment, the transfer of data may be repeated substantially continuously, thereby providing streaming data transfer. However, at some point the source device may, as depicted at block 812, stop sending data. Stopping may include a pause in sending during the streaming of data, and/or may include an end to the streaming of data. In one embodiment, the source device may stop sending data if the accumulated transfer credit value falls below a threshold (e.g., the accumulated value of transfer credits falls to zero). In some embodiments, stopping the sending of data may involve inhibiting programming of transfer requests into a DMAC.

Figure 9:
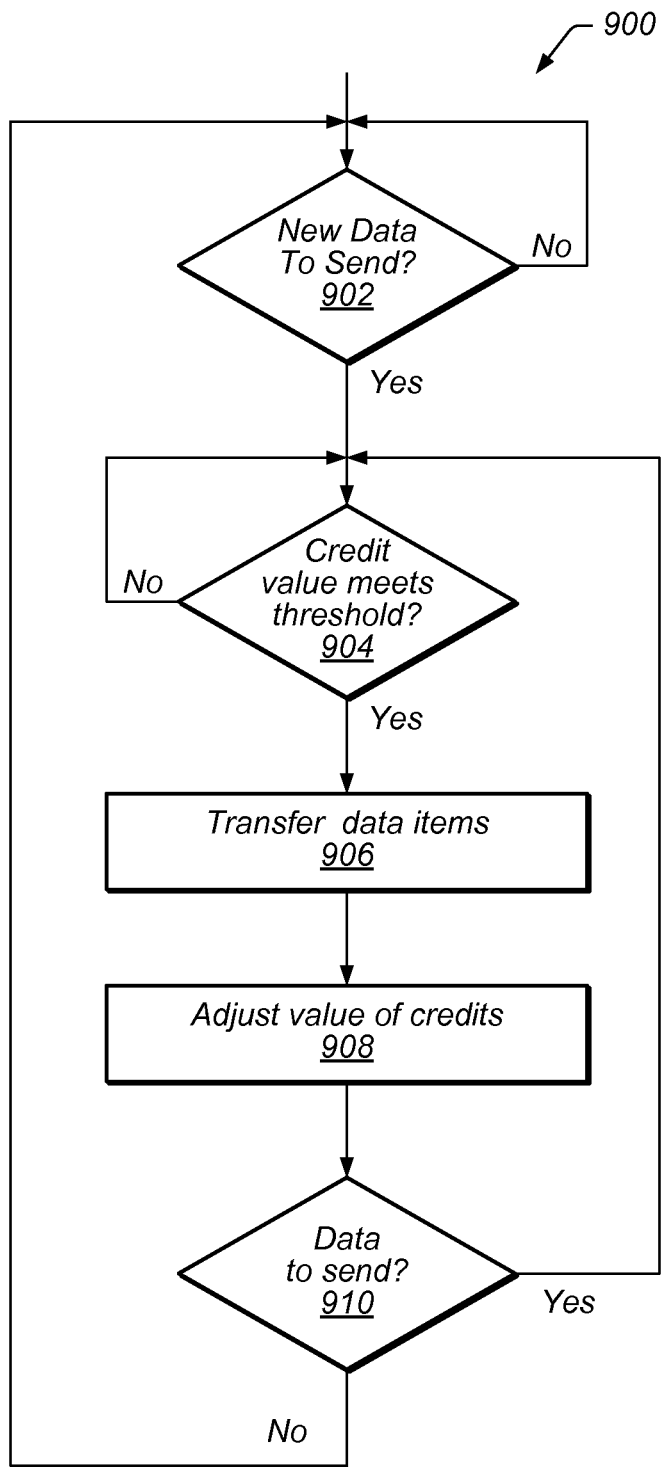
FIG. 9 is a flowchart that illustrates sending data in accordance with one or more embodiments of the present invention.

FIG. 9 is a flowchart that depicts an exemplary method 900 for transferring data in accordance with one or more embodiments of the present technique. Such a technique may be performed by a source device. Moreover, it will be appreciated that method 900 may be implemented in conjunction with any of the techniques described herein, such as those described with respect to FIG. 8. In the illustrated embodiment, method 900 may include determining whether or not there is new data to send, as depicted at block 902. For example, the source device may first determine if there is data to be sent. This may involve determining if there is initial data to be sent and/or may involve determining if there is new data to be sent. For example, it may be determined whether or not data is stored in a buffer/FIFO of the sending device. If there is no new (or initial) data to be sent the sending device may wait until such data is available, repeating step 902 as illustrated.

In the illustrated embodiment, if it is determined that there is new data to be sent, before starting to send data, the sending device may first determine if the accumulated transfer credit value meets or exceeds a threshold, as depicted at block 904. For example, in one embodiment the sending device may determine if the current value of transfer credits is greater than zero. In some embodiments a default value of transfer credits may be automatically granted upon initialization. If the current value of transfer credits does not meet a threshold, the sending device may wait for a target device to grant a sufficient number of transfer credits, as depicted. If there are enough transfer credits, the source device may then start to transfer data to the target device. In one embodiment, the sending of data may be performed by one or more of the source device, a DMAC coupled to the source device, a DMAC module on the source device or a bus master associated with the source device. For ease of explanation, sending may be described hereafter as sending by the source device. In FIG. 9, the sending is depicted as being contained within an iterative loop comprising elements 904, 906, 908 and 910.

In one embodiment, if it is determined (either prior to sending or during sending), that the accumulated transfer credit value meets/exceeds a threshold (block 904) then the source device may transfer one or more data items to the target device, as depicted at block 906. The size of each data item may depend on system characteristics such as the nature of bus connecting the source and target devices.

In some embodiments, determining if the accumulated transfer credit value meets/exceeds a threshold may include determining if there is sufficient data for a specific size/type of data transfer. The ability to stream large quantities of data across a bus may depend upon the utilization of the bus. The utilization of the bus may, in turn, depend on the type of bus transfers performed and may also depend on the quantity of data associated with each data transfer. In buses such as PCIe, each packet may have a fixed amount of overhead, so sending small packets may not make optimum use of the available bus bandwidth. Furthermore, sending larger packets to aligned buffers in memory may make better use of the available target memory bandwidth.

Sending and receiving devices (e.g., peripherals) may make better use of transfer bandwidth of a connecting bus (or some other type of link) by using a transfer quantity value known as Preferred Packet Size (PPS). In some embodiments, the sending of data may be delayed until a quantity of data corresponding to the PPS is available for sending. Then, when at least a PPS quantity of data is available, data of PPS size may be sent. Similarly, in some embodiments, the requesting of data (to be sent to the receiving device) may be delayed until a quantity of storage space of PPS size is available for receiving. Then, when at least a PPS quantity of space is available, the requesting of data of PPS size may be made. In some embodiments, where the peripheral-to-peripheral link is PCIe the PPS may be, for example, set to 4096 bytes. In some embodiments the PPS may be set to, for example, $2^N$ bytes, where N is an integer so that, for example the PPS may be set to 4 bytes, 64 bytes or 2048 bytes, etc.

In some embodiments, a mechanism referred to as an "Eviction Timer" (ET) may be used in association with PPS. For example, an ET may be used to cause a data to be sent when less than a PPS quantity of data has been accumulated. For example, an ET may set a given period of time to wait for a given amount of data (e.g., a PPS) to accumulate. If enough data is accumulated (e.g., at least a PPS) before the expiration of the ET, then the data may be sent. If enough data is not accumulated before the expiration of the ET, then the data present may be sent, regardless of whether or not it meets the given amount. This may be useful when quantity of data waiting to be transferred is not a multiple of the PPS. An ET may be programmable and may be set, for example, to a value of 1 uS. Circuitry associated with an ET may reset the ET every time a new data item for sending is obtained.

In conjunction with sending, the accumulated transfer credit value may be adjusted, as depicted at block 908. In one embodiment, the accumulated transfer credit value may be decremented by reducing the current value of transfer credits by a number indicative of the quantity of data sent. In another embodiment, the accumulated transfer credit value may be decremented by increasing a number indicative of the value of used transfer credits. Other embodiments may utilize various other methods of counting the amount of credits used and comparing the used credits against the number of credits granted, thereby decreasing (as data is sent) accumulated transfer credit value.

After transferring one or more data items, the source device may determine if there is more data to send as depicted at block 910. If there are more data items to be sent then while the current value of transfer credits meets/exceeds a threshold, as determined at block 904, the transferring of data may continue. If however, the current value of transfer does not meet/exceed a threshold, the source device may wait for additional transfer credits to be granted (e.g., looping at block 904). In one embodiment the threshold may be set to zero but in other embodiments the threshold may be non-zero. The threshold may be set so that, for example, a specific type of data transfer may not cause the value of granted transfer credits to fall below zero.

Figure 10:
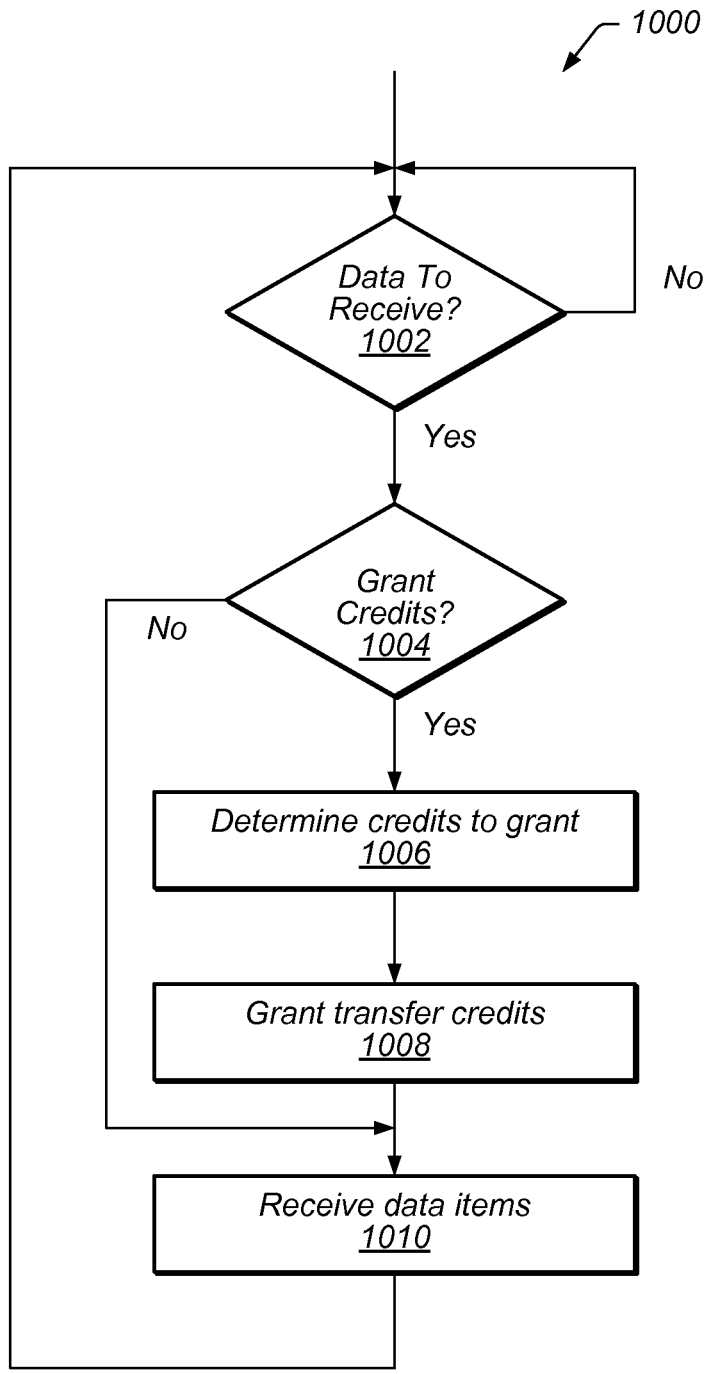
FIG. 10 is a flowchart that illustrates receiving data in accordance with one or more embodiments of the present invention.

FIG. 10 is a flowchart that depicts an exemplary method 1000 for receiving data in accordance with one or more embodiments of the present technique as may be performed by a target (e.g. receiving) peripheral. In the illustrated embodiment, method 1000 may include determining whether there is data to receive, as depicted at block 1002. In one embodiment, a target peripheral may determine if there is data to be received. This may involve determining if there are initial data to be received and it may also involve determining if there are new data to be received. On determining that there is no new (or initial) data to be received the target device may wait (e.g., perform other activities) until it is determined that there is data to receive. In some embodiments, determining if there is data to receive may involve determining if there is sufficient storage space to receive data.

In one embodiment, method 1000 may include determining whether or not to grant transfer credits, as depicted at block 1004. For example, before starting to receive data, the receiving device may determine if it should grant transfer credits to the sending device. As discussed above, if the sending device does not have sufficient transfer credits it may not send data. Determining whether to grant transfer credits may involve many factors. For example, it may involve determining the value of transfer credits already granted, the quantity of data transmitted, and/or determining free storage space on the receiving device.

In some embodiments, method 1000 may include determining the value of transfer credits to grant, as depicted at block 1006. Determining this value may involve many factors. For example, it may involve determining the value of transfer credits already granted, the quantities of data transmitted, and/or free storage space. Once the value of transfer credits to grant has been determined, the credits may be granted, as depicted at block 1008. In one embodiment, credits are granted/issued to the source device. Granting of the transfer credits may enable the source peripheral to start or continue sending data items as described above. As depicted at block 1010, method 1000 may also include receiving one or more data items. For example, after sufficient credits have been granted, the source device may send data as described above, and the data may be received at the target device. As depicted, method 1000 may also include returning to block 1002 to determine if there is more data to be received. As described above, the process of sending and receiving described with respect to FIGS. 9 and 10 may occur in concert (e.g., in parallel) such that data may be streamed continuously between the devices.

Although the embodiments above have been described in considerable detail, numerous variations and modifications will become apparent to those skilled in the art once the above disclosure is fully appreciated. It is intended that the following claims be interpreted to embrace all such variations and modifications. Furthermore, note that the word "may" is used throughout this application in a permissive sense (e.g., having the potential to, being able to), not a mandatory sense (e.g., must). The term "include", and derivations thereof, mean "including, but not limited to". As used in this specification, the singular forms "a", "an" and "the" include plural referents unless the content clearly indicates otherwise. Thus, for example, reference to "a device" includes a combination of two or more devices.

We claim:
1. A modular data acquisition system, comprising:
a plurality of peripheral devices, wherein the plurality of peripheral devices are configurable by a host central processing unit (CPU) to implement a processing chain for acquiring, processing, or generating data, wherein after being configured by the host processor, the processing chain is configured to acquire, process, or generate data in a streaming manner without passing the data through a processor or a memory of the host central processing unit of the modular data acquisition system;
wherein the plurality of peripheral devices comprise:
a first peripheral device comprising a data acquisition module, the first peripheral device comprising:
an external data input, wherein the first peripheral device is configured to receive measurement data via the external data input; and
a peripheral device output configured to couple to a system interconnect of the modular data acquisition system; and
a second peripheral device of the modular data acquisition system, configured to couple to the first peripheral device via the system interconnect, wherein the second peripheral device comprises a data processing module;
wherein the first peripheral device is configured to transfer at least a portion of the measurement data to the second peripheral device of the modular data acquisition system via the system interconnect in the streaming manner, and wherein the second peripheral device is configured to process at least a portion of the measurement data transferred to the second peripheral device in the streaming manner.

2. The modular data acquisition system of claim 1,
wherein to receive measurement data via the external data input, the first peripheral device is configured to receive analog input via the external data input;
wherein the first peripheral device is further configured to digitize the analog input to generate digital measurement data;
wherein to transfer the at least a portion of the measurement data to the second peripheral device, the first peripheral device is configured to send at least a portion of the digital measurement data to the second peripheral device.

3. The modular data acquisition system of claim 2, wherein the second peripheral device is further configured to:
process the at least a portion of the digital measurement data;
convert the processed digital measurement data to an analog waveform; and
output the analog waveform.

4. The modular data acquisition system of claim 1, wherein the first peripheral device is configured to receive transfer credits from the second peripheral device, wherein the first peripheral device is configured to:
transfer the at least a portion of the measurement data to the second peripheral device via the system interconnect of the modular data acquisition system in response to an accumulated transfer credit value satisfying a send threshold; and
not transfer the at least a portion of the measurement data to the second peripheral device of the modular data acquisition system via the system interconnect if the accumulated transfer credit value does not satisfy the send threshold.

5. The modular data acquisition system of claim 1, wherein the first peripheral device is configured to directly transfer the measurement data to the second peripheral device via the system interconnect independent of the host CPU.

6. The modular data acquisition system of claim 1,
wherein a majority of the measurement data processed by the modular data acquisition system is processed on a peripheral device in the processing chain other than the first peripheral device.

7. The modular data acquisition system of claim 1, further comprising:
a third peripheral device comprised in the processing chain, coupled to the first peripheral device via the system interconnect;
wherein the first peripheral device is configured to transfer at least a portion of the measurement data in parallel to the second peripheral device and the third peripheral device.

8. The modular data acquisition system of claim 7,
wherein the second and third peripheral devices are configured to process, in parallel, at least a portion of the measurement data transferred to the second peripheral device and the third peripheral device, respectively.

9. The modular data acquisition system of claim 7,
wherein the first peripheral device is configured to transfer at least a portion of the measurement data in series to the second peripheral device and the third peripheral device.

10. The modular data acquisition system of claim 9,
wherein the second peripheral device is configured to:
process at least a portion of the measurement data transferred to the second peripheral device; and
transfer at least a portion of the measurement data processed to the third peripheral device for further processing.

11. The modular data acquisition system of claim 9,
wherein the second peripheral device is configured to:
process at least a portion of the measurement data transferred to the second peripheral device; and
transfer at least a portion of the measurement data processed by the second peripheral device to the third peripheral device for output.

12. The modular data acquisition system of claim 7, wherein the first peripheral device is configured to transfer at least a portion of the measurement data in series, directly to the second peripheral device, wherein the second peripheral device is configured to process at least a portion of the measurement data transferred to the second peripheral device, wherein the second peripheral device is configured to transfer at least a portion of the measurement data processed to the third peripheral device, and wherein the third peripheral device is configured to process at least a portion of the measurement data transferred to the third peripheral device.

13. The modular data acquisition system of claim 7, wherein the modular data acquisition system is configured to implement a control loop, wherein the third peripheral device comprises an external output configured to externally output a control output signal, wherein the first peripheral device is configured to transfer at least a portion of the measurement data to the second peripheral device, wherein the second peripheral device is configured to process at least a portion of the measurement data transferred to the second peripheral device, wherein the second peripheral device is configured to transfer at least a portion of the measurement data processed by the second peripheral device to the third peripheral device, and wherein the third peripheral device is configured to output, via the external output, a signal indicative of the measurement data transferred to the third device.

14. The modular data acquisition system of claim 1, wherein the system interconnect is dynamically configurable.

15. The modular data acquisition system of claim 1, wherein the plurality of peripheral devices are configured to be disposed in a plurality of expansion slots of a modular chassis during use, wherein the first peripheral device is configured to be disposed in a first expansion slot of the modular chassis during use, and wherein the second peripheral device is configured to be disposed in a second expansion slot of the modular chassis during use.

16. The modular data acquisition system of claim 1, further comprising:
the modular chassis, comprising:
the plurality of expansion slots, wherein the plurality of expansion slots are configured to receive one or more modular devices during use; and
the system interconnect, configured to communicatively couple one or more of the modular devices to one another during use.

17. The modular data acquisition system of claim 1, wherein the second peripheral devices comprises:
a processor configured to process measurement data; and
an input coupled to the system interconnect.

18. The modular data acquisition system of claim 1,
wherein the second peripheral device comprises an external data output; and
wherein a signal indicative of at least a portion of the measurement data processed is output via the external output.

19. A method, comprising:
providing measurement data at an external input of a first peripheral device of a modular data acquisition system, the first peripheral device comprising a data acquisition module; and
transferring measurement data directly from the first peripheral device to a second peripheral device via a system interconnect of the modular data acquisition system, the second peripheral device comprising a data processing module;
wherein the second peripheral device comprises a processor configured to process at least a portion of the measurement data transferred; and
wherein directly transferring measurement data via the system interconnect comprises transferring measurement data from the first peripheral device to the second peripheral device in a streaming manner without passing the data through a processor or memory of a host central processing unit (CPU) of the modular data acquisition system.

20. The method of claim 19, further comprising:
the first peripheral device receiving transfer credits from the second peripheral device;
wherein said transferring measurement data is performed in response to an accumulated transfer credit value satisfying a send threshold; and
wherein the first peripheral device does not transfer the measurement data to the second peripheral device if an accumulated transfer credit value does not satisfy the send threshold.

21. The method of claim 19, further comprising:
receiving user input dynamically configuring the transfer of at least a portion of the measurement data to the second peripheral device via the system interconnect.

22. The method of claim 19,
wherein the first peripheral device directly transfers the measurement data to the second peripheral device via the system interconnect independent of the host CPU.

* * * * *